US012567023B2

(12) United States Patent　　　　(10) Patent No.:　US 12,567,023 B2

Levy et al.　　　　　　　　　　　　(45) **Date of Patent:　*Mar. 3, 2026**

(54) METHOD FOR CONTROLLING PACKAGE DELIVERY

(71) Applicant: Luxer Corporation, McClellan Park, CA (US)

(72) Inventors: Arik Seth Levy, Sacramento, CA (US); Bryan Robert Peebler, El Dorado Hills, CA (US); David Patrick O'Riva, Rocklin, CA (US)

(73) Assignee: Luxer Corporation, McClellan, CA (US)

( * ) Notice: Subject to any disclaimer, the term of this patent is extended or adjusted under 35 U.S.C. 154(b) by 299 days.

This patent is subject to a terminal disclaimer.

(21) Appl. No.: 18/361,148

(22) Filed: Jul. 28, 2023

(65) Prior Publication Data

US 2024/0013139 A1　　Jan. 11, 2024

Related U.S. Application Data

(63) Continuation-in-part of application No. 16/447,445, filed on Jun. 20, 2019, now Pat. No. 11,763,615.

(51) Int. Cl.
　　*G06Q 10/0836*　　(2023.01)
　　*G07C 9/00*　　(2020.01)
(52) U.S. Cl.
　　CPC ..... *G06Q 10/0836* (2013.01); *G07C 9/00571* (2013.01)

(58) Field of Classification Search
　　CPC .................... G07C 9/00896; G07C 2009/0092
　　See application file for complete search history.

(56) References Cited

U.S. PATENT DOCUMENTS 10,074,068 B2　　9/2018　Irwin et al.
11,488,077 B1 *　11/2022　Lyman ................ H04L 12/2825
　　　　　　　　　　(Continued)

OTHER PUBLICATIONS

Gavin Bailey, Boxed up and locked up, safe and tight! Making the case for unattended electronic locker bank logistics for an innovative solution to NHS hospital supplies (UK), 2015 (Year: 2015).*

(Continued)

*Primary Examiner* — Ismail A Manejwala

(74) *Attorney, Agent, or Firm* — Wolf, Greenfield & Sacks, P.C.

(57)　　　ABSTRACT

A method and system are provided in which information about a barcode on a package is received or more generally, information placed on a package by a delivery service (such as a barcode or other code) is detected. Characteristics of the information or code are extracted. The characteristics of the information or code are compared to characteristics of information or code associated with acceptable delivery services. If the characteristics of the code or information on the package correspond to characteristics of the information or code used by an acceptable delivery service, a locked area is unlocked to allow the package to be delivered. In other embodiments, other types of markings may be placed on the package by the delivery service, and the storage system may check whether those markings have, or information has, the characteristics of an acceptable delivery service.

23 Claims, 8 Drawing Sheets

(56)  References Cited

U.S. PATENT DOCUMENTS

|            |       |         |                        |
|------------|-------|---------|------------------------|
| 11,488,774 B2 | 11/2022 | Lyman |                      |
| 2019/0088054 A1* | 3/2019 | Wulf ................. | G06Q 10/0832 |
| 2019/0259232 A1* | 8/2019 | Nandakumar ..... | G07C 9/00896 |
| 2020/0402336 A1 | 12/2020 | Levy et al. |              |
| 2023/0122764 A1 | 4/2023 | Deshpande |              |

OTHER PUBLICATIONS

International Search Report and Written Opinion mailed Oct. 18, 2024 for International Application No. PCT/US2024/038984.

* cited by examiner

<u>230</u>

300a

300c

Scan/Parce Barcodeand/or Label 308

Request Scan of Barcode/
Request Photograph
of Label 324

Receive Scan of Barcode/
Photograph of Label 325

Detect Barcode(s)
326

Determine Pattern,
Format, Structure, and/or
Content of Barcode 328

300d

METHOD FOR CONTROLLING PACKAGE DELIVERY

CROSS-REFERENCE TO RELATED APPLICATIONS

This application is a Continuation-in-Part of U.S. Non-Provisional patent application Ser. No. 16/447,445, entitled, "METHOD FOR CONTROLLING PACKAGE DELIVERY," filed on Jun. 20, 2019, by Arik Seth Levy, which is incorporated herein by reference.

The following commonly owned United States patents and patent applications, including the present application, are related to each other. Each of the below seven patents and patent applications are incorporated herein by reference in its entirety:

- U.S. Non-Provisional patent application Ser. No. 14/505,457, entitled "METHOD AND SYSTEM FOR IMPLEMENTING ELECTRONIC STORAGE AREAS," by Arik Seth Levy, filed Oct. 2, 2014, now U.S. Pat. No. 10,810,537;
- U.S. Non-Provisional patent application Ser. No. 14/668,883, entitled "METHOD AND SYSTEM FOR IMPLEMENTING ELECTRONIC STORAGE AREAS," filed Mar. 25, 2015, by Arik Seth Levy, now U.S. Pat. No. 10,445,687;
- U.S. Non-Provisional patent application Ser. No. 15/222,917, entitled "METHOD AND SYSTEM FOR CONTROLLING A STORAGE ROOM," filed Jul. 28, 2016, by Arik Seth Levy, now U.S. Pat. No. 11,625,675;
- U.S. Pat. No. 7,844,507, entitled "HANDLING HOUSEHOLD TASKS," by Arik Seth Levy, filed Mar. 22, 2006;
- U.S. Pat. No. 8,401,932, entitled "HANDLING HOUSEHOLD TASKS," by Arik Seth Levy, filed Oct. 18, 2010;
- U.S. Pat. No. 8,359,249, entitled "STORAGE LOCKER," by Arik Seth Levy, filed Aug. 28, 2011; and
- U.S. Pat. No. 8,725,600, entitled "STORAGE LOCKER," by Arik Seth Levy, filed Dec. 20, 2012.

Each of the above patents and patent applications are incorporated herein by reference in its entirety

FIELD

The current specification relates to package delivery to a storage room and/or apartment building.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Typically, delivery to a storage room or apartment requires entry into a locked area. This specification recognizes methods of providing entry.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Figure 1:
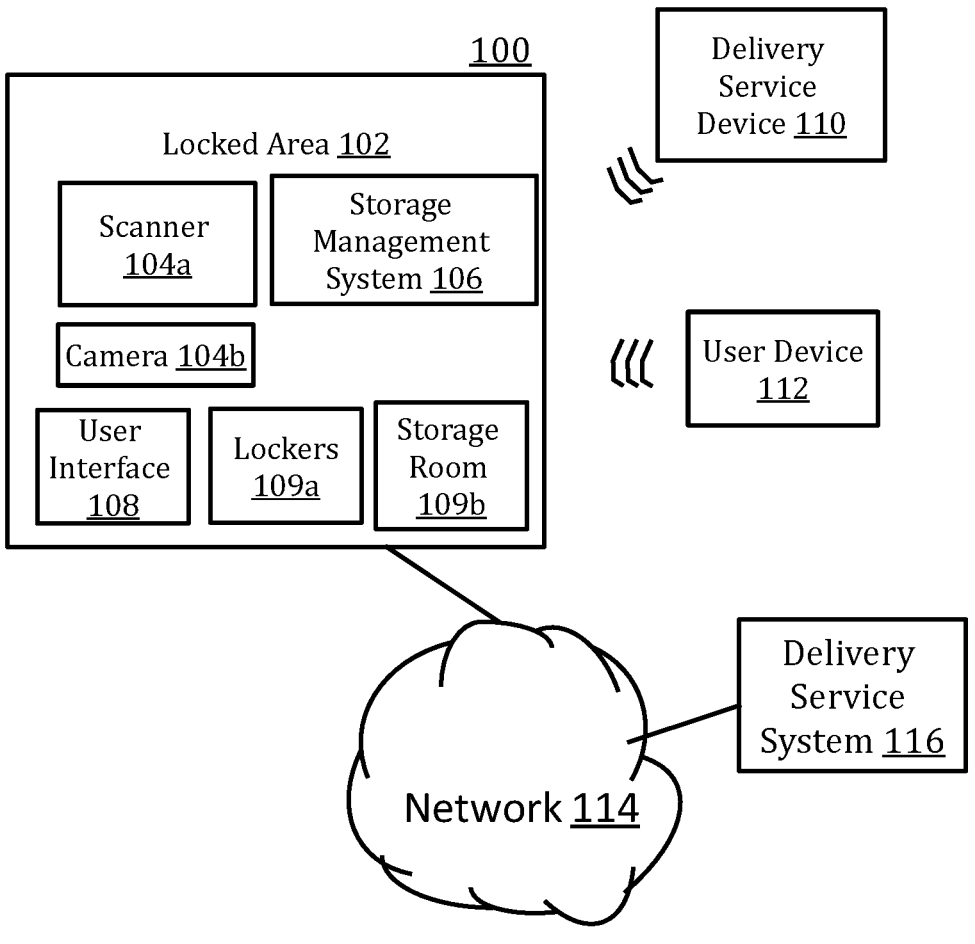
FIG. 1 shows a block diagram of an embodiment of a system for managing delivery of a package.

In general, at the beginning of the discussion of each of FIGS. 1-2 is a brief description of each element, which may have no more than the name of each of the elements in one of FIGS. 1-2 that is being discussed. After the brief description of each element, each element is further discussed in numerical order. In general, each of FIGS. 1-2 is discussed in numerical order and the elements within FIGS. 1-2 are also usually discussed in numerical order to facilitate easily locating the discussion of a particular element. Nonetheless, there is no one location where all of the information of any element of FIGS. 1-2 is necessarily located. Unique information about any particular element or any other aspect of any of FIGS. 1-2 may be found in, or implied by, any part of the specification.

In this specification, the term "logic" refers to a specialized circuit, embedded software, middleware (note embedded software is hardware and middleware includes hardware), software, a specialized processor, a Very Large Scale Integration (VLSI) chip, a configured Application Specific Integrated Circuit (ASIC), a configured Field Programmable Gate Array (FPGA), or other logic circuit optimized and/or configured for the task in question (see U.S. Pat. No. 6,785,872 for methods for converting algorithms into circuits, which is incorporated herein by reference).

FIG. 1

FIG. 1 shows a block diagram of an embodiment of a package delivery system 100. Package delivery system 100 may include locked area 102, barcode scanner 104a, camera 104b, storage management system 106, user interface 108, lockers 109a, storage room 109b, delivery service device 110, user device 112, network 114, and delivery service system 116. In other embodiments, package delivery system

100 may not have all of the elements or features listed and/or may have other elements or features instead of or in addition to those listed.

In at least one embodiment, the delivery system may include any aspects and steps that are provided in United States patent applications BU-1 (patent number BU-2 (U.S. Pat. No. 10,445,687), and BU-3 (U.S. Pat. No. 11,625,675), which are herein incorporated by reference in their entirety.

Locked area 102 may be any area used for receiving a delivery of a package. In at least one embodiment, locked area 102 may include a kiosk, a storage room, a bank of multiple lockers, an apartment building, or any area that allows for receipt of delivery of a package. In at least one embodiment, locked area 102 may be within another area that may or may not be locked. In at least one embodiment, for example, the locked area 102 may be a storage room containing lockers for delivery of packages within an apartment building that is accessible by entering the apartment building. In an embodiment, the locked area is a locked room or building that may contain a locked storage room and/or lockers, and the room or building may have no other function other than housing the lockers or storage room. Locked area 102 may store a delivery management system.

Entering, the locked area and/or opening a locker, may require the presentation of the barcode, passcode, username, delivery company name, and/or identifying information, and opening the locker and/or the storage room may require, presenting the same information and/or different information again. It may be required that the barcode (or other code) have one of several patterns that are associated with codes used by supported delivery services. A "supported" delivery service is a delivery service that is a user or customer of the package delivery system. Further, the terms "supported" delivery service and "accepted" delivery service are interchangeable herein. In some embodiments, the barcode may be converted into symbols such that a sequence of symbols may represent specific information. The mapping between messages and barcodes may be referred to as the "symbology" of the barcode.

In an embodiment, the locked area 102 has a lock that can be unlocked using the package delivery system 100. In at least one embodiment, the lock is an electrical lock that can be unlocked automatically after validation to allow delivery. In at least one embodiment, the lock is a mechanical lock and the package delivery system 100 provides information to the delivery person to tell the delivery person in which locker to place the package. In at least one embodiment, the locked area 102 is communicatively connected to a network and/or a server. In an embodiment, locked area 102 includes a camera-based (as opposed to a dedicated hardware-based) barcode scanning system that grants delivery services access to a locker (or in another embodiment, a residence) based on a scan of a valid barcode tracking number. In an embodiment, the basic flow of camera-based barcode access recognition may include (1) a delivery service presents the package label in the camera view frame; (2) device software determines which barcode (from several shown on the label) is most likely to be a tracking number; (3) device software converts the tracking number barcode into alpha-numeric characters, and, in cases where the barcode includes more than the tracking number, extracts the correct tracking number from the barcode information; the software then submits the tracking number for verification with the delivery service (the submission can either be directly to the delivery service API or through a 3rd party service); (4) device software receives a response from the delivery service information that includes whether the tracking number is valid and the date/time of delivery and (optionally) information about the intended delivery destination (for example Zip Code); (5) device software compares the information received against (a) known information about the location (if provided); and (b) a preconfigured 'window' for the time after delivery which tracking numbers will be accepted to authorize access (e.g., accept packages that have been designated as 'delivered' within the last 10 minutes); and (6) if the tracking number is valid and fits location information and the time window information, the device software sends a signal to unlock the door. Note that barcode verification can be combined with Optical Character Recognition (OCR) data to further strengthen the validation (e.g., grant access if a valid tracking number and/or name on the package is a current resident). The system may include a "camera" that can produce "camera images" in a form usable by the rest of the system, a securable "package repository" that can contain one or more packages, an "electronic lock" that can be opened by transmitting a signal to the electronic lock and that indicates by a signal whether the electronic lock is open or closed, and a device or program that identifies and parses valid barcodes from a camera image or series of camera images (the "barcode scanner"). Throughout this specification, the terms camera, text scanner, and barcode scanner are used interchangeably. Throughout this specification where ever any of the terms camera, text scanner, and barcode scanner occurs, any of them may be substituted for the other to get a different embodiment, or any device capable of capturing a barcode and/or other information on a label of a package may be substituted to get other embodiments. Similarly, throughout this specification, the concept of a camera image, the concept of capturing information from the label of a package, and the concept of a barcode scan may be substituted one for another to get different embodiments. Note that the identification of the correct barcode is one component of some embodiments—the package labels presented to the camera often have multiple barcodes "in a frame" that are captured simultaneously. The program determines which barcode to attempt to validate. The program may also determine what portion of a parsed barcode (some tracking number barcodes contain more than the tracking number) to submit to a processor system to determine whether to allow access to locked area 102. In an embodiment, a User Interface (UI) element is included, which when the camera observes multiple barcodes in the frame, can guide the delivery service to center the view frame on the tracking number barcode that is the correct tracking number barcode. In an embodiment, a device or program associated with locked area 102 can ascertain the status of a given tracking number with a given package delivery service (the "validator") to validate the package. In an embodiment, a program or device (the "recognizer") is associated with locked area 102 that deduces package delivery service identity, tracking number(s) and/or address information from observed label features, utilizing one or more of the image(s) from the "camera," any features reported by the "barcode scanner," any features reported by the "text scanner" (in an embodiment, system 100 performs a combination of barcode reading and OCRing). In an embodiment, a component of the "recognizer" classifies barcode values according to their likelihood of representing a package delivery service tracking number. In an embodiment, after a predetermined amount of time, after a delivery service has scanned in a package as "delivered," the system will consider the tracking number to be "invalid." Anyplace where the term "invalid" is used, "unable to authenticate" may be substituted for getting a different embodiment. At times, a barcode, a delivery, a delivery person, and/or a delivery service may in fact be valid, but due to limitations of the system and errors in stored data, the system is not capable of authenticating the barcode, delivery, delivery person, delivery service, and/or other information may be treated as invalid. Note that sometimes delivery services will scan a group of packages as 'delivered' at once, and then subsequently deliver the packages to multiple residences. In an embodiment, a program or device (the "controller") is activated, the "camera" observes a valid delivery service label (as determined by the "recognizer") with a tracking number that the "validator" indicates is still in transit or was marked as delivered within a time threshold, grants access to the "package repository" by issuing a signal to the "electronic lock." In an embodiment, the time threshold may be set by the delivery service, the manager of the locked room, the delivery person, and/or the recipient. In an embodiment, a device or program is associated with the locked area 102, which, after the "electronic lock" has been opened, monitors whether the electronic lock remains opened or has been closed. If the lock remains open for longer than a predetermined threshold time, an audible and/or visible warning may be generated through one or more additional connected devices. The threshold time may be set by the intended recipient, delivery service, manager of the locked area 102, and/or the delivery service person. Optionally, the locked area 102 may include a device or program that identifies and parses text from a camera image or series of camera images (the "text scanner"). In an embodiment, a component of the "recognizer" classifies multiple text values with associated relative positions according to their likelihood of representing a partial or complete shipping address, which may be presented to the delivery person for correction and/or used as a basis for denying access (if the probability of the address being associated with a valid address and/or the barcode being valid is below a predetermined threshold).

Scanner 104a is a scanner that scans codes on the package so that the codes may be read and parsed. Scanner 104a may be a barcode scanner and may include a laser scanner.

Camera 104b is a camera that takes a picture of barcodes on a label and/or a package (which may have one or multiple barcodes). Camera 104b may analyze barcodes (or other codes and/or patterns on the package) and/or the label on the package and/or send the image of the label to another machine for performing the analysis.

The barcode on the package may be any type of barcode readable by a computer algorithm. In at least one embodiment, the barcode is a square barcode or a linear barcode. In at least one embodiment, the barcode may be segmented into different parts that provide specific information about the delivery. For example, in at least one embodiment, the first three digits of the barcode may be a larger location (e.g., a country or state), the next three digits of the barcode may be a sublocation within the larger location (e.g., a city), and the next three digits of the barcode may be the address of the locked area 102, and the next three digits may be the address, apartment number, and/or name of the recipient. In at least one embodiment, there may also be digits within the barcode that relate to the valid delivery time for the package. In at least one embodiment, there may be digits within the barcode that corresponds to a valid delivery service and/or delivery person. Of course, if the barcode is a square code, the digits could correspond to squares within the square barcode and provide the same information (including address, valid delivery service, valid delivery time, etc.) Different delivery services may use different formats for the barcode. In this specification, the terms delivery service and carrier are used interchangeably. Anywhere either term appears, either term may be substituted with the other to obtain a different embodiment.

Anywhere in this specification where a barcode is mentioned, another code or pattern may be substituted to obtain a different embodiment. Additionally, a barcode may be made up of bars and/or may be a pattern of other shapes, such as a box with squares of different sizes, darkness, colors, and/or density within the box. In at least one embodiment, scanner 104a or camera 104b scans the barcodes or patterns and uploads the barcode or pattern that was scanned to the storage management system 106 (which may analyze the label in addition to, or instead of, the analysis performed by scanner 104a or camera 104b) that is communicatively connected with the scanner 104a or camera 104b. Scanner 104a or camera 104b may include its own processor and logic for analyzing barcodes and for automatically focusing the camera on the label and/or package. In at least one embodiment, locked area 102 is communicatively connected to a network and/or a server.

Storage management system 106 may recognize the barcodes or patterns and may retrieve information optionally from a database in the storage management system 106, based on the barcode scanned. Storage management system 106 may determine whether to allow access to locked area 102, based on the barcode on the package. In at least one embodiment, in addition to, or instead of, scanner 104a scanning the label, camera 104b may take a picture of a label including delivery information, such as names and addresses of the intended recipient and/or sender. In at least one embodiment, camera 104b may take a picture of the package and/or the delivery person. In other embodiments, scanner 104a or camera 104b includes other structures and/or functions. Scanner 104a or camera 104b may be associated with the locked area 102, which may include a location where the delivery person can position the label, barcode, package, and/or the delivery person to best take a photograph. The camera may include instructions for positioning and/or allowing the delivery person to move the camera for best positioning, and the camera may generate a signal indicating that the object being photographed is in focus. Scanner 104a or camera 104b may be built into storage management system 106. In an alternative embodiment, a scanner (e.g., a barcode scanner) or any device for capturing information from a package may be used for, instead of, or in addition to, a camera. In this specification, the terms "camera," "scanner," "device for capturing information," and "information capture device" are used interchangeably and may be substituted one for another anywhere in the specification to get different embodiments.

Storage management system 106 is a system that processes the information from the scanner 104a or the camera 104b and identifies the information contained within the barcode and/or the information within the label. The identification of the information in the barcode may be used to determine whether the package is being delivered to the correct address, whether the delivery person delivering the package is legitimate, and/or invalid whether the delivery service is valid. By checking the barcode information and/or other information on the package, the inadvertent delivery of a package to a wrong address may be prevented or the allowance of someone that is posing as a delivery person from entering a secure area (e.g., from entering an apartment building) may be prevented. Additionally, or alternatively, the security of locked area 102 may be improved by preventing the delivery personnel that are not legitimate from entering locked area 102 and/or by preventing the delivery of unwanted packages.

In at least one embodiment, the storage management system 106 may distinguish between multiple barcodes and if the package has multiple barcodes, storage management system 106 may identify which barcode corresponds to an accepted delivery service and optionally is associated with the locked area 102 (by designating the locked area as the delivery destination) or whether a barcode that corresponds to the locked area 102 is present on a package that a delivery person is attempting to deliver. Storage management system 106 may determine whether the barcode that is photographed is a valid barcode by examining the format and/or other characteristics of the barcode. For example, the storage management system may determine whether the bars of the barcode all have the same height, whether all the bars have the same width, whether there is a numerical code written out in Arabic numerals within the barcode, and whether the barcode is two dimensional (e.g., and is a box with squares in it) or one dimensional (having a line of bars). Storage management system 106 may store multiple formats for barcodes (or other characteristics of barcodes) and may determine the delivery service delivering the package based on the barcode. Additionally or alternatively, two barcodes associated with two different delivery services may have the same types of barcodes (e.g., both use one-dimensional barcodes in which the bars all have the same height but different widths), but storage management system 106 may distinguish two barcodes from one another based on the length of the barcode, the number of bars in the barcode, the type of information in the barcode, and/or the order in which the information is present in the barcode. For example, in the barcode of one delivery service, the first group of five bars may encode the postal code (e.g., the zip code), followed by a group of bars that encode a city code, followed by a group of bars that encode a street address, whereas another delivery service may use the first two groups of bars for a country code, the next two groups of bars to encode a code that represents the state. Similarly, one delivery service may use ASCII to encode alphanumeric data, whereas another delivery service may use a 5-bit code to encode numerical characters and may not allow alphabetical characters. If there is no barcode on the package that corresponds to an acceptable delivery service, in an embodiment, access to locked area 102 may be denied.

Optionally, storage management system 106 may determine whether the delivery is valid (e.g., whether the package has been delivered within a time limit), whether the delivery service is valid, whether the delivery person is a valid delivery person (e.g., associated with the valid delivery service), and/or whether the barcode information matches with the information on the label. In at least one embodiment, a valid barcode may be a barcode that has a tracking number. In at least one embodiment, if there is more than one barcode, invalid barcodes may be automatically excluded during the process of photographing the label, barcode(s), and/or package. In at least one embodiment, a valid time for delivery may be required for the package to be accepted. A valid delivery time may be computed based on a typical amount of time that the delivery is expected to require, based on the starting and ending address and the internal information for the delivery service (e.g., such as information from the delivery service about when the package was sent and/or delivered, and how long the delivery service may take to process the package).

In at least one embodiment, storage room manager 106 compares the pattern of the code to patterns of codes of supported delivery services. For example, it may be that the first three digits of the code of one of the supported delivery services are always 0s or never contain any digits greater than 4. The length of the code may always have a fixed number of characters. The pattern may change with time. For example, one of the supported delivery services uses 9-digit codes and assigns the codes in sequential order, during the first several years after the delivery service was started, prior to when the delivery service handles its 1,000,000$^{th}$ package, storage room manager 106 may only need to check whether the first three digits are either 000 or 001. After the issuance of the code 001000000 (as a result of the delivery service picking up or receiving the 1,000,000$^{th}$ package), then it may be sufficient to check for 9-digit codes starting with the three digits 001 or 002. Other examples of patterns may include different portions of the code tending to have values with a certain range. For example, perhaps the last section of the code (e.g., the last three digits) or some other section of the code (e.g., the 5$^{th}$, 6$^{th}$, 7$^{th}$, and 8$^{th}$ symbols of the code) never has values above a certain value (e.g., 4). Perhaps one part of the code is always digits and another part of the code is always alphabetic characters. Perhaps, one part of the code (e.g., the 3$^{rd}$ and 4th characters) may include any alphanumeric character, but other parts of the code cannot. Perhaps certain symbols are never used in the code. Storage room manager 106 may store rules and/or criteria that determine whether or not a code has a particular pattern that is associated with one or more supported delivery services.

Optionally, storage room manager 106 may check the symbology of the code, and determine whether any of the supported delivery services used the symbology of the code. If none of the supported delivery services uses the symbology of the code, access to the locked area 102 may be denied. The symbology of the code may affect the pattern of the code, and in some instances, the code may not have a pattern that is used by any of the supported delivery services, as a result of not using the correct symbology. The symbology of the barcode optionally used by supported carriers may be used to detect whether a package is being delivered by a supported delivery service. If the barcode does not use a symbology that is used by the barcodes of one of the supported delivery services, access to the locked area 102 may be denied. Elements of the symbology that may be used to determine whether the symbology corresponds to a symbology used by a supported delivery service may include determining whether the barcode is encoded as bars and spaces, whether there are symbols and/or markers that indicate the start and/or stop of a word, phrase, and/or message, whether or not there is a required quiet zone before and/or after the barcode, whether or not a checksum is provided in the barcode, whether the symbology is continuous or discrete. If there is a required quiet zone, a determination is made of the size of the quiet zone. Regarding determining whether the symbology is continuous or discrete, in a discrete symbology, the characters may be a series of bars, boxes, and/or other shapes, and spaces that have meaning. Additionally, there may be some spaces between characters that do not convey information. Alternatively, the symbology may be continuous, and the characters may be made of bars, boxes, and/or other shapes, and spaces, where all the spaces have meaning. Thus, the system may detect whether or not the barcode includes spaces with no meaning if all the supported delivery services use continuous barcodes or all the supported delivery services use noncontinuous barcodes. In an embodiment, the system may detect whether or not there is a special end pattern that has bars, boxes, or other shapes on one or both ends of the barcode indicating the beginning and/or end of the barcode. Optionally, the bars, boxes, or other shapes of the barcode may have only two (or more) widths/heights (or two sizes, such as wide and narrow or tall and short) (e.g., for using a binary encoding), and the system may check for a binary encoding, such as by checking for the presences of two widths/heights, or shades. Alternatively or additionally, a binary encoding may be checked for by identifying whether spaces of two widths/heights, "wide" and "narrow" (or short and tall) are present in addition to, or instead of, using bars of two widths and/or heights. In an embodiment, storage room manager 106 and/or system 100 may check whether the widths and/or heights of the bars, boxes, or other shapes fall within a particular acceptable range, such as between 2 and 3 times the width/height of the narrow/short bars boxes, and/or other shapes. In an embodiment, a check may be made to determine whether a binary barcode is used, by checking whether there is a presence or absence of bars and/or spaces of the same height and/or width. In an embodiment, storage room manager 106 and/or system 100 may check whether all bars and/or spaces are multiples of a basic width, e.g., 1, 2, 3, and/or 4 times the basic width (as required by some symbologies). In an embodiment, a check may be made to determine whether some characters are encoded using black bars, boxes, and/or other shapes of one or more particular widths/heights, and other bars may be encoded using spaces or white bars boxes and/or other shapes of one or more widths/heights. Optionally, a check may be performed to determine whether a symbology used by a supported delivery service is present by checking whether the characters encoded using white bars may be interweaved and/or in the same locations as the characters encoded using black bars, boxes, and/or other shapes. In an embodiment, a check may be made for whether the characters are stacked vertically forming several stacked rows of characters, for example. Optionally, a check may be made for whether the boxes, bars, dots, and/or other shapes are arranged in a two-dimensional matrix. Optionally, a check may be made to determine whether the matrix forms a square, circle, rectangle, oval, and/or other shape and/or whether there is another shape within the matrix, so as to determine whether the symbology of the barcode is a symbology used by a supported delivery service.

In at least one embodiment, the code (e.g., the barcode) on the package is sent to the delivery service to see if the delivery service recognizes the code and, if the delivery service recognizes the code, the delivery service sends information about the package, which may be related to the expected time when the package should have arrived, that may be used for validating the package. Alternatively, in at least one embodiment, when a delivery service plans on delivering a package and/or when a delivery service starts the delivery of a package, a message may be sent to storage management system 106, which may include an earliest expected delivery time and/or a latest expected delivery time (and if the package arrives outside the delivery time sent, entry to locked area 102 may be denied). Throughout this specification, the terms "time," "day," and "time and day" are used interchangeably and may be substituted one for the other to obtain different embodiments (e.g., arrival "time and day" may be substituted for "arrival time" to obtain a different embodiment). In at least one embodiment, the amount of time allowed for a delivery may be from 5 minutes to 7 days, including but not limited to, 10 minutes, 30 minutes, 60 minutes, 5 hours, 10 hours, 24 hours, 2 days, 3 days, 4 days, 5 days, 6 days, or 2 weeks. The delivery time may be associated with the barcode on the package and the address (e.g., a database within the memory of the computer system may associate a reasonable delivery time with the general area for the address—see FIG. 2). Optionally, the expected delivery times may be encoded in the barcode. Optionally, the time and/or day that the package was sent is encoded into the barcode, and an acceptable arrival time is computed by storage management system 106 (based on the location of the sender and the time sent). If the arrival time is outside of the acceptable arrival time, access to locked area 102 is denied. The storage management system 106 may trigger access to the locked area 102 based on the information from the camera. Alternatively, the computer system may also include information provided via a keypad and/or a delivery service device to identify, validate, and/or to trigger access. Storage management system 106 is discussed in more detail with reference to FIG. 2.

User interface 108 may include a keypad, touch-sensitive screen, and/or other input device associated with the locked area 102 that allows the delivery person to enter information that may be used to allow entry into the locked area 102 including but not limited to, a code, a username, a password, and/or signature, which may be required in addition to, and/or instead of the barcode. User interface 108 may include a Graphical User Interface (GUI) and/or monitor for displaying the graphical user interface. In at least one embodiment, the barcodes read from the package may be compared to the information entered by the delivery service person. In at least one embodiment, user interface 108 includes (or may be) a keypad that facilitates entering a password or passcode for unlocking at least one of the electronic locks. In this specification, anywhere an electronic lock is mentioned, any automated lock or any device for securing the opening and closing of an area may be substituted to get another embodiment. User interface 108 may include a touchpad. In at least one embodiment, the user interface 108 may be part of the camera, a kiosk, locked area 102, storage management system 106, and/or a computer associated with the locked area 102, or a separate keypad that is connected to the locked area 102, via a cable or wire, and/or via a wireless connection. In another embodiment, each of the doors of a storage room, apartment building, apartment, and/or walls of the storage room (or receptacles of a storage area) may include a user interface 108 mounted on the door or close to the door (e.g., on the door frame, in a room or entrance area in front of the door, or on the wall near the door), and the user may walk up to the door or other location of the keypad to key in a password or passcode (in addition to or instead of a barcode). Alternatively, a user may use a touch-sensitive screen to enter information into storage management system 106 to be analyzed and processed.

Lockers 109a may include one or more lockers (or banks of lockers). Lockers 109a may have electronic locks. Based on the barcode on the package, one of lockers 109a may open. The locker that is opened may optionally be determined from the address information that is encoded in the barcode. Lockers 109a are optional. Optionally, each locker of lockers 109a may be designated for a particular user. Alternatively, each locker is used for storing items until the user picks up the items and then the locker may be used to store packages for another user once a new package is delivered. Storage room 109b may store items on behalf of multiple users simultaneously. Storage room 109b is optional and may be used with, or instead of, lockers 109a. Any package repository may be substituted for lockers 109a and/or storage room 109b.

Delivery service device 110 is a computerized device that can be carried by the delivery person and allows for entry of other information that can be used to validate access to locked area 102. Delivery service device 110 may be a specialized package delivery device that is used by the delivery person to log deliveries, track packages, and/or track the delivery person. Alternatively, delivery service device 110 may be a smartphone (having an app for the delivery person to interact with), a pad, a computer, or any device. For example, the delivery person may be a part-time contractor that sets their own hours. The delivery person may download an app from a server, and then enter delivery information into the app as the user is delivering the packages. The information entered into the app may be sent to the machine of the delivery service. Delivery service device 110 may communicate the information to the storage management system 106 to be analyzed and processed. Delivery service device 110 may be used for viewing the GUI of user interface 108. In at least one embodiment, a delivery device 110 may include a camera or scanner and/or may take the place of the scanner 104a or camera 104b. In other words, delivery service device 110 may include a camera that is associated with a Graphical User Interface (GUI) and can transmit the information from the photograph to the storage management system 106, via a network. In at least one embodiment, the delivery service device 110 is communicatively connected to a network. Optionally, a delivery service person may communicate with storage management system 106 in addition to, or instead of, using delivery service device 110. Optionally, delivery service device 110 may include a camera and a package that the delivery service person would like to deliver may be photographed, via delivery storage device 110, and sent to storage management system 106 for analysis to gain entry to locked area 102 and deliver a package.

User device 112 may be a mobile device, such as a mobile phone or tablet computer, which is used by a user for picking up a package. User device 112 may interface with storage management system 106, via which the user may enter a password and/or other credentials (e.g., a fingerprint, retinal scan, digital token, username, and/or PIN) to gain access to locked area 102 to pick up a package delivered. Optionally, delivery service person may communicate with storage management system 106 in addition to, or instead of, using delivery service device 110. Optionally, user device 112 may include a camera, and a package that the delivery service person would like to deliver may be photographed, by user device 112, and sent to storage management system 106 for analysis to gain entry to locked area 102 and deliver a package.

Network 114 may be any one or any combination of one or more Local Area Networks (LANs), Wide Area Networks (WANs), wireless networks, telephone networks, and/or other networks. Network 114 may be used by locked area 102, scanner 104a, camera 104b, storage management system 106, user interface 108, lockers 109a, storage room 109b, delivery service device 110, user device 112, and/or delivery service system 116, and/or delivery persons to communicate with one another regarding items being delivered to locked areas 102.

Figure 2A:
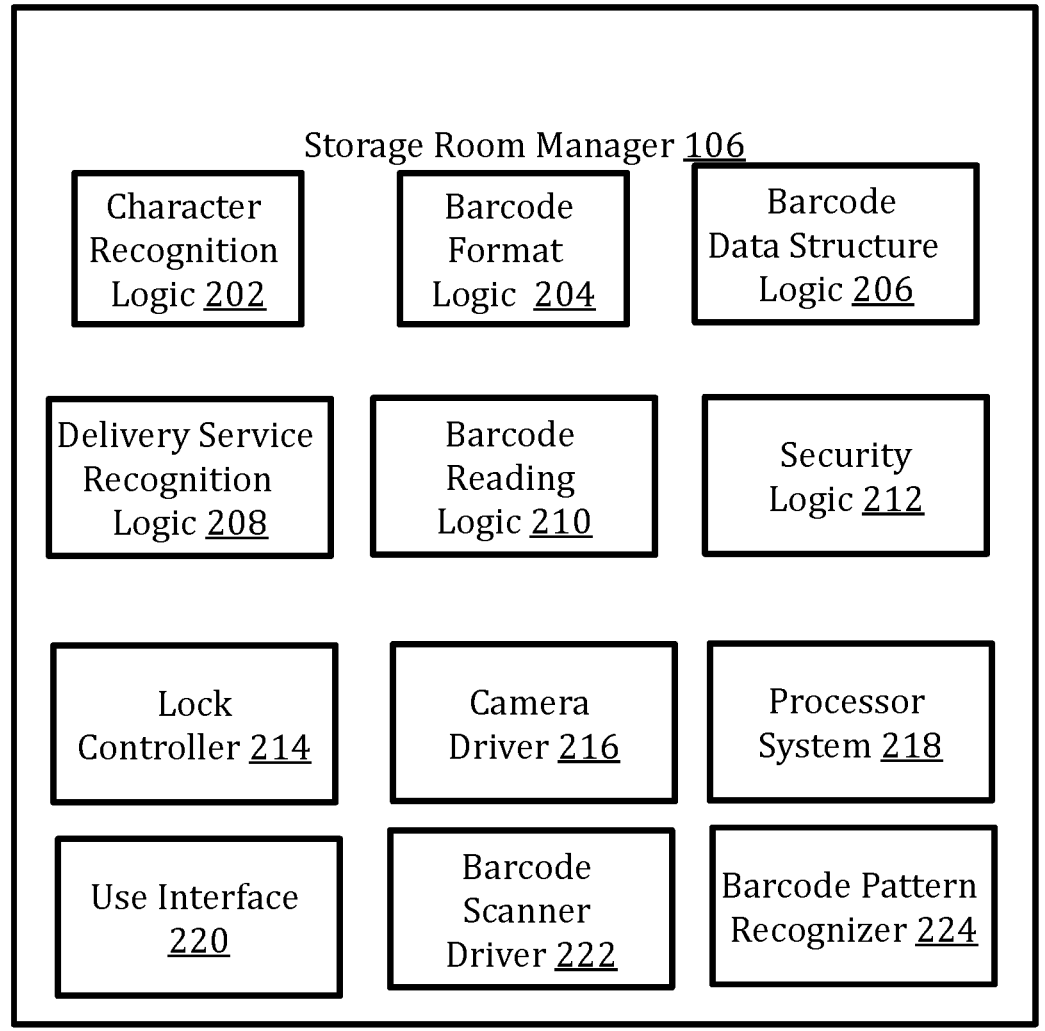
FIG. 2A shows a block diagram of an embodiment of a system for managing delivery of a package.

Delivery service system 116 may coordinate deliveries on behalf of a delivery service. Each delivery service 116 may use a different type of code having a different pattern of symbols and/or different symbology. Optionally, the delivery service system 116 may communicate with delivery service device 110 and/or user device 112 (while the delivery person is delivering packages) regarding delivery schedules, the progress in delivering packages to their destinations, and/or about whether a package was deliverable. Delivery service system 116 may communicate with user device 112 to inform the user about when to expect delivery of a package upon request of the user device 112 and/or at the initiative of delivery service system 116. Delivery service system 116 may communicate with storage management system 106 to initially inform, or in response to a request, inform and/or update storage management system 106 regarding when a particular package is expected to be delivered or is believed to have been delivered, so that storage management system 106 can determine whether a delivery of a package should be accepted, based on the barcode and time of arrival (which optionally may be encoded into the barcode). Optionally, locked area 102 may be dedicated to receiving items delivered by delivery service system 116. Alternatively, delivery service system 116 may be just one of several delivery services that deliver packages to locked area 102. The delivery service and delivery service system 116 are just one example of a validator and a validator system that validates the delivery of a package. The validator of the delivery of a package may also be a separate standalone service having a separate standalone system within which storage management system 106 may exchange information and/or receive information for validating that a delivery, a package delivered, and/or a delivery person are legitimate and are the delivery, the package delivered, and/or the delivery person that they are purported to be. Anywhere a delivery service device 110 or delivery service system 116 is mentioned any validator or validator system may be substituted to get a different embodiment.
FIG. 2A

FIG. 2A shows a block diagram of an embodiment of a storage management system 106 that may be used as storage management system 106 in FIG. 1. The storage management system 106 may include character recognition logic 202, barcode format logic 204, barcode data structure logic 206, delivery service recognition logic 208, barcode reading logic 210, security logic 212, lock controller 214, camera driver 216, processor system 218, user interface 220, scanner driver 222, and code pattern recognizer 224. In other embodiments, storage management system 106 may not include all of the components listed and/or may include other components in addition to or instead of those listed above.

Character recognition logic 202 is logic that recognizes characters, such as alphanumerical characters and/or bars or other elements of a barcode. Using character recognition logic, the characters that form the user's address and/or the bars on a barcode that appear in an image of the package being delivered and/or label may be recognized.

Barcode format logic 204 is logic that may determine the format of the barcode and which delivery service and/or other entity may have placed the barcode on the package. Barcode format logic 204 may determine that a barcode is present, but that the barcode does not correspond to any delivery service or other entity that is authorized to deliver the package. Barcode format logic 204 may be capable of distinguishing multiple barcodes from one another and determining whether any of the barcodes are associated with a delivery service authorized to deliver packages, or that is permitted to deliver packages to a particular location.

Barcode data structure logic 206 determines the structure of the barcode to determine whether the barcode corresponds to the barcode of an accepted delivery service. However, whereas barcode format logic 204 determines the spatial and/or visual characteristics of the barcode (such as how densely packed the bars are, whether bars are used or squares are used, whether alphanumeric characters in addition to the bars appear in the barcode), by contrast, barcode data structure logic 206 determines the order in which different types of information is placed in the barcode, the type of information in the barcode, the type of encoding used in the barcode (e.g., how many bars are used to represent a character). Barcode format logic 204 and barcode data structure logic 206 may be combined into the same logic unit. Barcode format logic 204 and/or barcode data structure logic 206 may detect other characteristics of barcodes, which may be compared to characteristics of acceptable delivery services to determine whether to allow the package to be delivered.

Delivery service recognition logic 208 is logic that may match indicators of which delivery service is delivering a package with a particular delivery service, or determine that there is no delivery service that matches the indicators of the identity of the delivery service. For example, the delivery service may be identified based on a combination of factors which may include the format of the barcode, a code entered by the delivery service person delivering the package (which may identify the delivery person and/or delivery service), the identity of the delivery person, an image of the delivery service person, and/or the uniform worn by the delivery service person. In an embodiment, the barcode format logic 204, barcode data structure logic 206, and/or delivery service recognition logic 208 may be the same logic unit.

Barcode reading logic 210 may be logic that is capable of parsing a barcode. For example, character recognition logic 202 may identify the number of bars in a barcode, the relative spacing between bars of a barcode, and/or the relative thickness of the bars of a barcode and convert that information into bits and/or alphanumeric characters, and barcode reading logic 210, and may parse the alphanumeric information into information about the sender and/or intended recipient, such as the name address, storage unit number, of the sender, delivery service, time of sending, and/or intended recipient. Barcode reading logic 210 may receive output from barcode format logic 204 and/or delivery service recognition logic 208 (in addition to the output received from barcode character recognition logic 202), which may be helpful in parsing the barcode.

Security logic 212 is logic that determines whether to open a facility, such as a building, an apartment, a storage room, a room that houses lockers, and/or an individual locker based on the information provided, such as for the purpose of allowing a package to be delivered. For example, security logic 212 may decide whether to allow a delivery person or user to open and/or enter a building, an apartment, a storage room, a room that houses lockers, and/or an individual locker based on a barcode on the package and/or based on other information provided by the delivery person or user that desires to pick up a package. Security logic 212 may receive output from barcode format logic 204, delivery service recognition logic 208, and/or barcode reading logic 210 that may be used to determine whether a lock should be opened. Character recognition logic 202, barcode format logic 204, barcode data structure logic 206, delivery service recognition logic 208, barcode reading logic 210, and/or security logic 212 may be grouped together and/or replaced with a recognizer or recognizer logic that parses barcode and determines whether the barcode (or other code), delivery person, and/or package is authentic (and can be recognized).

Lock controller 214 may control the opening and closing of one or more locks. Lock controller 214 may produce an electrical signal or cause storage management system 106 to open a lock to allow a delivery person to deliver a package or a delivery person or user to pick up a package. The lock may be an electronic lock that is on a building, an apartment, a storage room, a room that houses lockers, and/or an individual locker. Lock controller 214 may receive output from barcode format logic 204, delivery service recognition logic 208, barcode reading logic 210, and/or security logic 212 that causes the lock controller to open a lock.

Camera driver 216 may drive and/or communicate with camera 104*b* and may cause camera 216 to take a picture of a label and/or the person attempting to access the building, apartment, storage room, room that houses lockers, and/or individual locker. The image may be sent to and/or used by barcode format logic 204, delivery service recognition logic 208, barcode reading logic 210, and/or security logic 212 to determine the format of a barcode, to read the barcode and/or address label, to determine the intended recipient, to determine the delivery service, determine the sender of the package and/or to determine whether to grant access to the building, apartment, storage room, room that houses lockers, and/or individual locker.

Processor system 218 may include and/or implement the same functions as character recognition logic 202, barcode format logic 204, barcode data structure logic 206, delivery service recognition logic 208, barcode reading logic 210, security logic 212, and/or lock controller 214.

User interface 220 may include a keypad, keyboard, mouse, touchscreen, and/or a monitor. User interface 220, the monitor and/or touchscreen of user interface 220 may display an interactive GUI, which may be run by processor system 218. User interface 220 may be an embodiment of user interface 108.

Scanner driver 222 may drive and/or communicate with scanner 104*a* and may cause scanner 104*a* to scan the label to access the building, apartment, storage room, room that houses lockers, and/or individual lockers. The scan may be sent to and/or used by barcode format logic 204, delivery service recognition logic 208, barcode reading logic 210, and/or security logic 212 to determine the format of a barcode, to read the barcode and/or address label, determine the intended recipient, determine the delivery service, determine the sender of the package and/or to determine whether to grant access to the building, apartment, storage room, room that houses lockers, and/or individual locker.

Code pattern recognition 224 may be logic that determines whether the code on the package fits one of several predetermined patterns. Each pattern may be a pattern that fits the codes used by one of the supported delivery services. Some delivery services may have different types of codes for different types of packages and/or types of services offered. There may be multiple possible patterns that a code of a particular delivery service may conform to, where each pattern may be associated with a different type of service and/or package.

FIG. 2B

Figure 2B:
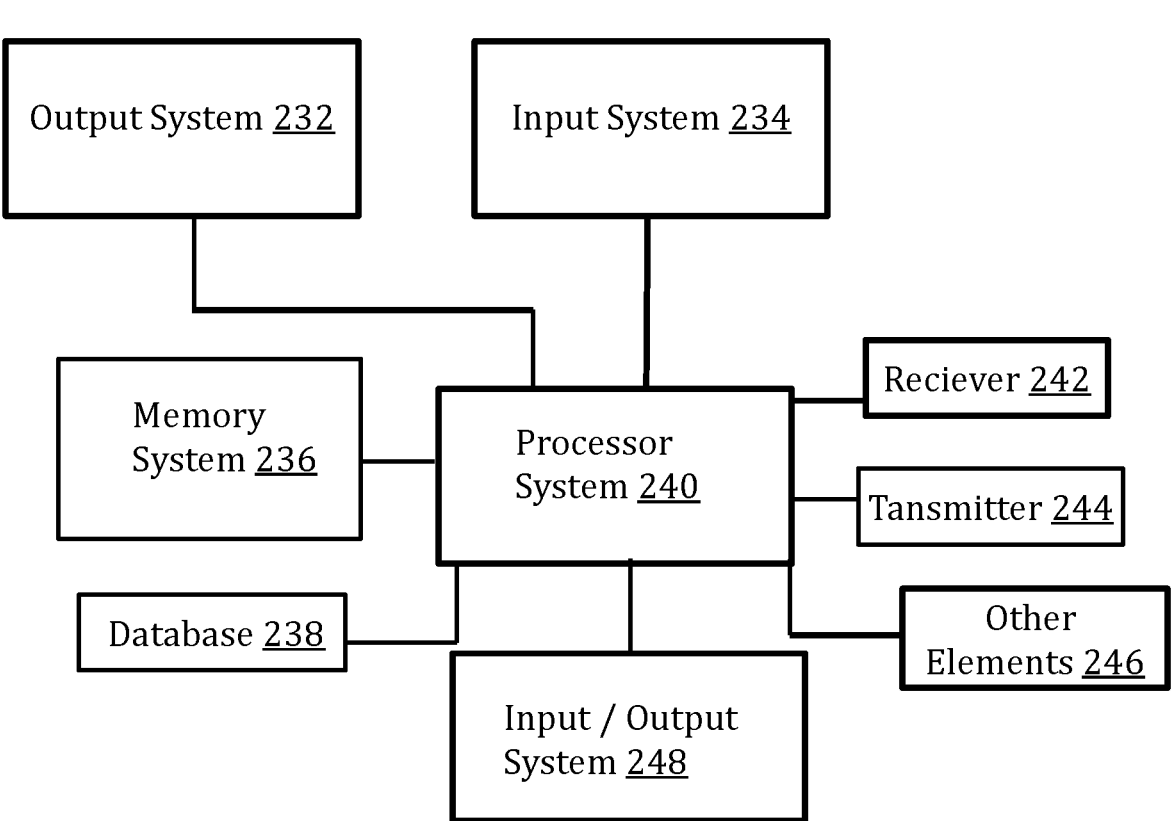
FIG. 2B shows a block diagram of an embodiment of a system for managing delivery of a package.

FIG. 2B shows a block diagram of an embodiment of a storage management system 230 that may be used as storage management system 106 in FIG. 1. The storage management system 230 may include an output system 232, an input system 234, a memory system 236, database 238, a processor system 240, receiver 242, transmitter 244, other elements 246, and an input/output system 248. In other embodiments, storage management system 230 may not include all of the components listed and/or may include other components in addition to or instead of those listed above.

Storage management system 230 may be an embodiment of storage management system 106 and/or storage management system 106 may be an embodiment of storage management system 230.

Output system 232 may include any one of, some of, any combination of, or all of a monitor system, a handheld display system, a printer system, a speaker system, a connection and/or interface system to one or more sound systems, a connection and/or interface system to one or more peripheral devices, a connection and/or interface system to one or more computer systems, a connection and/or interface system to one or more LANs, and/or a connection and/or interface system to one or more WANs, for example.

Input system 234 may include any one of, some of, any combination of, or all of an input system 234 that includes at least a keypad and a camera system (e.g. scanner 104*a* or camera 104*b*), a mouse system, a trackball system, a trackpad system, buttons on a handheld system, a microphone system, a connection and/or interface to a sound system, and/or a connection and/or interface system to a computer system, a connection and/or interface to an intranet, and/or a connection and/or interface to an internet (e.g., IrDA, USB), for example. In an embodiment, storage management system 230 is used as user interface 108 and input system 234 may be used for entering information, in storage management system 230. Input system 234 may further include a keypad, a scanner, and/or a camera (e.g., scanner 104*a* or camera 104*b*). In an embodiment, storage management system 230 is used as a lock interface, and input system 234 may include receivers for receiving wireless signals from a kiosk or optional user devices for interfacing with the locks of storage area 100. The keypad and/or camera may be optional for the lock interface.

Memory system 236 includes at least a lock controller for opening and closing a lock. Memory system 236 may include a camera driver for communicating with scanner 104*a* or camera 104*b*. Memory system 236 may include software for analyzing images of labels on packages, which may analyze barcodes and determine valid barcodes. Memory system 236 may include, for example, any one of, some of, any combination of, or all of a long-term storage system, such as a hard drive; a short-term storage system, such as random access memory and/or flash memory; and/or a removable storage system, such as a floppy drive, removable memory card, thumb drive, and/or a removable drive. Memory system 236 may include one or more machine-readable mediums that may store a variety of different types of information. The term "machine-readable medium" is used to refer to any non-transitory medium capable of carrying information that is readable by a machine. One example of a machine-readable medium is a computer-readable medium. Another example of a machine-readable medium is paper having holes that are detected that trigger different mechanical, electrical, and/or logic responses. In at least one embodiment, memory system 236 may include databases that associate specific parts of a barcode with specific information, such as location information, delivery service information, valid delivery time, and information about the package.

Database 238 may include information stored and arranged according to a schema. Database 238 may include a database server, which may be used to query the database for information. Database 238 may store user information of users of locked area 102, delivery services, such as delivery service device 110, delivery personnel, delivery service system 116, types of barcodes, and/or valid barcode types. Optionally, database 238 may be a relational database.

Processor system 240 may include any one of, some of, any combination of, or all of multiple parallel processors, a single processor, a system of processors having one or more central processors, and/or one or more specialized processors dedicated to specific tasks. Processor system 240 may be an embodiment of processor system 218. Processor system 240 may implement any of the algorithms stored in memory system 236. In an embodiment in which storage management system 230 is used as the lock interface, processor system 240 may implement machine instructions stored in the memory system of the lock interface, such as software for communicating with electronic locks, software for managing and controlling the electronic locks, software for authenticating a barcode or delivery service. In an embodiment in which storage management system 230 is used as the control terminal, the processor system 240 may implement machine instructions stored in the memory system 236 of the control terminal, such as software for receiving input from the delivery service, authenticating barcode information, sending instructions to the lock interface, and managing information about users and/or electric locks.

Processor system 240 may include specialized logic circuits for identifying barcodes, parsing barcodes, optical character recognition, and determining whether a barcode is valid.

In an embodiment in which storage management system 230 is used as and/or includes the lock interface, memory system 236 stores software for communicating with the locked area (see locked area 102 in FIG. 1), optional user devices and/or electronic locks, which are implemented by processor system 240. In at least one embodiment, memory system 236 stores software that may include machine instructions for authenticating user information and/or password, managing and controlling the electronic locks, for example, which may be implemented by processor system 240. In at least one embodiment, memory system 236 may further include a lock control module and user database and/or a delivery service database, and a database server is implemented by processor system 240. In an embodiment in which storage management system 230 is used as the control terminal, memory system 236 stores software for receiving user input, authenticating user information and/or password, communicating with the lock interface, etc., which may be implemented by processor system 240.

In an embodiment, the lock control (e.g., lock controller 214) includes instructions and/or algorithms for controlling and/or managing the locks. In at least one embodiment, the lock control receives a request to open an electronic lock that locks a designated door. In an embodiment, the request is received at the locked area (locked area 102 in FIG. 1) or optionally from the delivery service device (see delivery service device 110 in FIG. 1) via wireless signals or from user input via the input system 234 or an input/output system 248. In at least one embodiment, the lock control receives a confirmation that the electronic lock is locked after the user closes the door. In at least one embodiment, the lock control records the identifiers of the electronic locks, the time of locking and unlocking of each electronic lock, the location of each of the electronic locks, etc. In at least one embodiment, the lock control receives a barcode/tracking number entered by a delivery service via the camera (or by a keypad).

In at least one embodiment, the lock control authenticates the delivery service by comparing the part of the barcode associated with the delivery service with the predetermined code or code pattern associated with a supported delivery service. In an embodiment, if a supported delivery service cannot be found that uses a code that has the pattern associated with the code that was read, access is denied. If the scanned barcode matches one or more code patterns of a supported delivery service, a message is sent to the delivery service. The message requests details associated with the code that was scanned. If the supported delivery service cannot identify, or no supported delivery service can identify, a package that uses the code sent, access to the locked area is denied and the lock is not unlocked. If the code is identified by the delivery service, the delivery service sends details associated with the package (e.g., delivery details, such as when the package was sent, when the package is expected to be delivered, or when the package was delivered). Based on the delivery details, a window for when the package should arrive or should have arrived is computed. If the package(s) did not, or does not, arrive within the window computed, access to the locked area is denied, and the lock control does not send a signal to the designated electronic lock to open the electronic lock. If the entered barcode and the predetermined code, code pattern, or parts thereof do not match, access is denied and the lock control sends a message to notify the user, such as an error message. Optionally, the error message may indicate that the barcode is invalid, that other authorization information or credential information is invalid, and/or that the user does not have the authorization to access the locked area. In an embodiment, the lock control may include information based on information in database 238. In an embodiment, the lock control will not open the electronic lock unless the barcode is found to be valid. In an embodiment, the lock control may receive a picture of the barcode from an optional user device. In at least one embodiment, when the camera photographs the barcode, the electronic lock sends signals to the lock interface and the lock control authenticates the barcode (e.g., by authenticating the delivery service, identifying a valid time for delivery, and/or identifying whether the delivery has already occurred) and returns a signal to the electronic lock to open or to deny access. In an embodiment of storage management system 230, the lock control of the control terminal sends signals to a lock interface to control the electronic locks. In at least one embodiment, the lock control may include an option to require a signature and/or a password prior to opening an electronic lock and/or to require only certain people to provide a signature to open the lock.

In embodiments, memory system 236 includes a delivery database (e.g., database 238) that stores information about the delivery service, such as a specific identifier within the barcodes for each specific delivery service, which room(s) a particular user is authorized to use, information that identifies the delivery service, and/or security information, such as passwords and/or copies of signatures. Delivery service database (or database 238) may also keep a record of when a user accessed a room and which room the user accessed.

Receiver 242 may receive radio and/or network communications and convert the incoming signal into digital data. Receiver 242 may be part of input system 234.

Transmitter 244 may transmit radio waves, internet signals, near field communications signals, ultrasound signals, and converts digital data to radio wave and/or electrical signals, internet signals, near field communications signals, and/or ultrasound signals. Transmitter 244 may be part of output system 232.

Other elements 246 may include any other elements.

Input/output system 248 may include devices that have a dual function as input and output devices. For example, input/output system 248 may include one or more touch-sensitive screens, which display an image and therefore are an output device and accept input when the screens are pressed by a finger or stylus, for example. The touch-sensitive screens may be sensitive to heat and/or pressure. For example, one or more of the input/output devices may be sensitive to a voltage or current produced by a stylus. Input/output system 248 is optional and may be used in addition to or in place of output system 232 and/or input device 234.

Processor system 240 communicatively links input system 234, memory system 236, output system 232, and/or input/output system 248 to each other. Storage management system 230 may include any one of, some of, any combination of, or all of electrical cables, fiber optic cables, and/or means of sending signals through air or water (e.g., wireless communications), or the like, for connecting the elements of storage management system 230. Some examples of means of sending signals through air and/or water include systems for transmitting electromagnetic waves such as infrared and/or radio waves and/or systems for sending sound waves.

FIGS. 3A-3D show an embodiment of a method 300 implemented by the system 100 of FIGS. 1, 2A, and 2B.

FIG. 3A

Figure 3A:
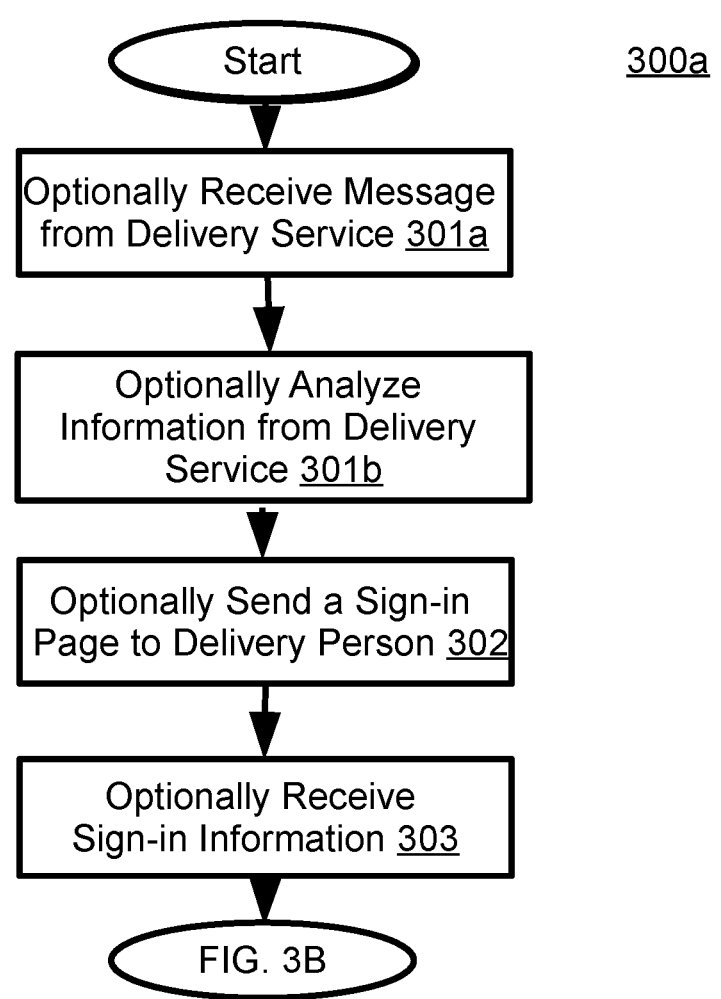
FIG. 3A shows a flowchart of an embodiment of a first part of a method for implementing the system of FIG. 1 from the point of view of the storage area manager.

FIG. 3A shows a flowchart of an embodiment of first part of a method for implementing the system of FIG. 1 from the point of view of the storage area manager. In optional step 301a, delivery service system 116 sends a message, via network 114, to storage management system 106 of locked area 102 that a package is being delivered and the approximate time that the package should arrive. Alternatively, the time that the package was sent and/or the approximate expected delivery time may be printed on the package (e.g., encoded in the barcode) or step 301a may be skipped entirely. In optional step 301b, a window may be established by storage management system 106 of locked area 102, processor system 218, and/or processor system 240 for when delivery of the package will be accepted, based on the time of receipt of the message from delivery service 116, the distance the package is traveling and/or the approximate arrival time received from delivery service system 116. If the time sent and/or the approximate time of arrival is on the package and/or in the barcode, the window of time within which the package will be accepted may be computed when the package arrives (or step 301b may be skipped or performed at a later point).

In optional step 302, a sign-in page is sent to the delivery person, by sending a sign-in page to a user interface 108, at storage management system 106 of locked area 102, to delivery service device 110, to user device 112, and/or another device. The sign-in page may include one or more fields for entering information, thereby requesting information such as an identifier of the delivery person, an identifier of the delivery service, information about the intended recipient, and/or information about the sender.

In optional step 303, the sign-in information is received at storage management system 106 and/or locked area 102. Optionally, as part of step 303, the sign-in is received, via a keypad, and/or touchscreen of input system 234 at the locked area 102, via delivery service device 110, and/or via user device 112. Optionally the sign-in may be conducted by a user with user device 112.

Optionally, an initial search may be conducted, via the storage management system 106, processor system 218, and/or processor system 240, within database 238, to validate the delivery person, intended recipient, expected time of arrival, and/or delivery service. In an embodiment, if the delivery person, intended recipient, sender, delivery service, and/or delivery service is not found, the locked area 102 does not open. Optionally, the delivery person, delivery service system 116, and/or delivery service is informed that the delivery person and/or delivery service was not validated. Alternatively, the search may be performed after the barcode information is determined.

In an embodiment, each of the steps of method 300a is a distinct step. In at least one embodiment, although depicted as distinct steps in FIG. 3A, steps 301a-303 may not be distinct steps. In other embodiments, method 300a may not have all of the above steps and/or may have other steps in addition to or instead of those listed above. The steps of method 300a may be performed in another order. Subsets of the steps listed above as part of method 300a may be used to form their own method.

FIG. 3B

Figure 3B:
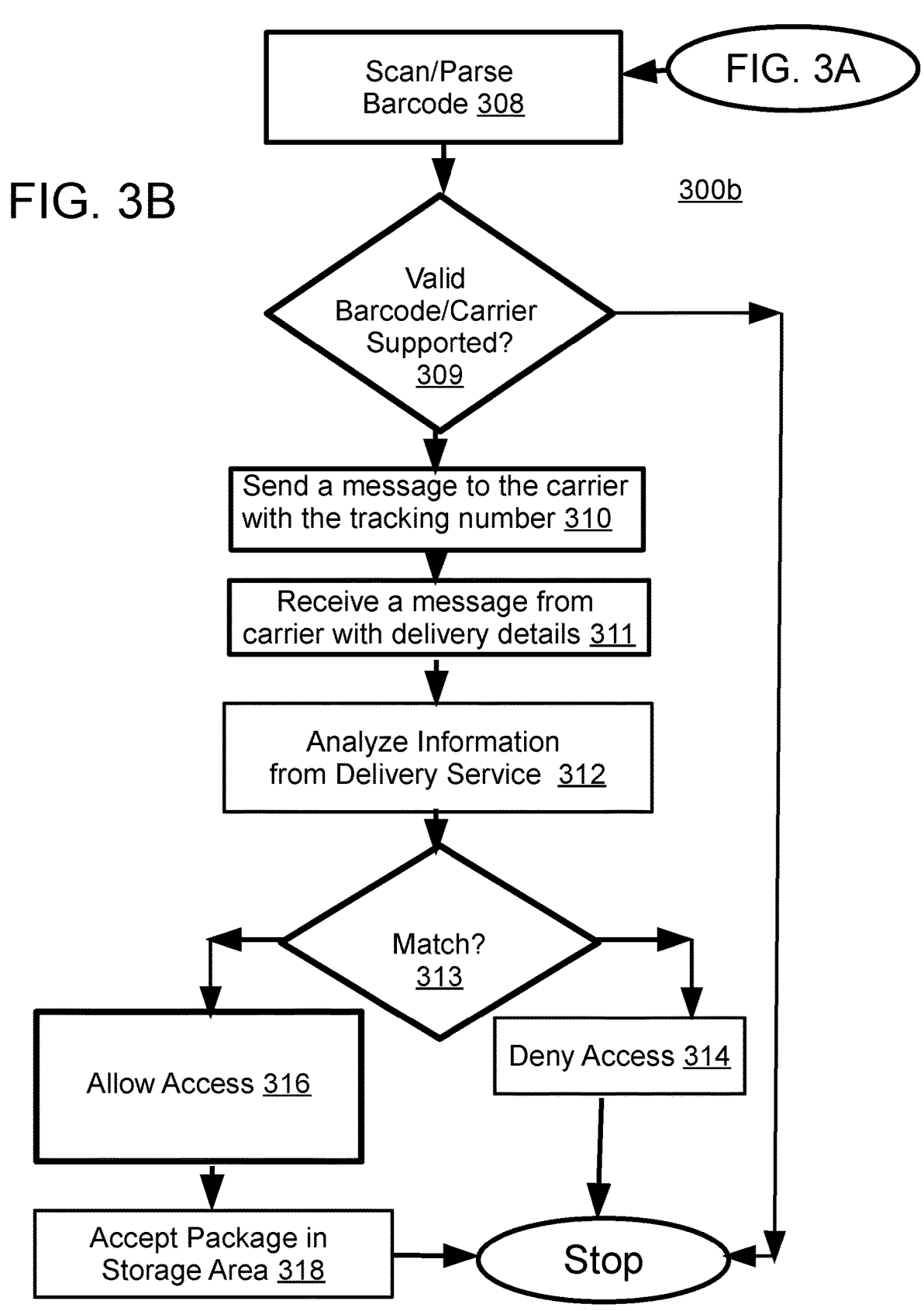
FIG. 3B shows a flowchart of an embodiment of a second part of a method for implementing the system of FIG. 1 from the point of view of the storage area manager.

FIG. 3B shows a flowchart of an embodiment of a method for implementing a second part of the method of FIG. 3A. In an embodiment, the steps discussed in FIG. 3A proceed those of FIG. 3B, but are optional.

Figure 3C:
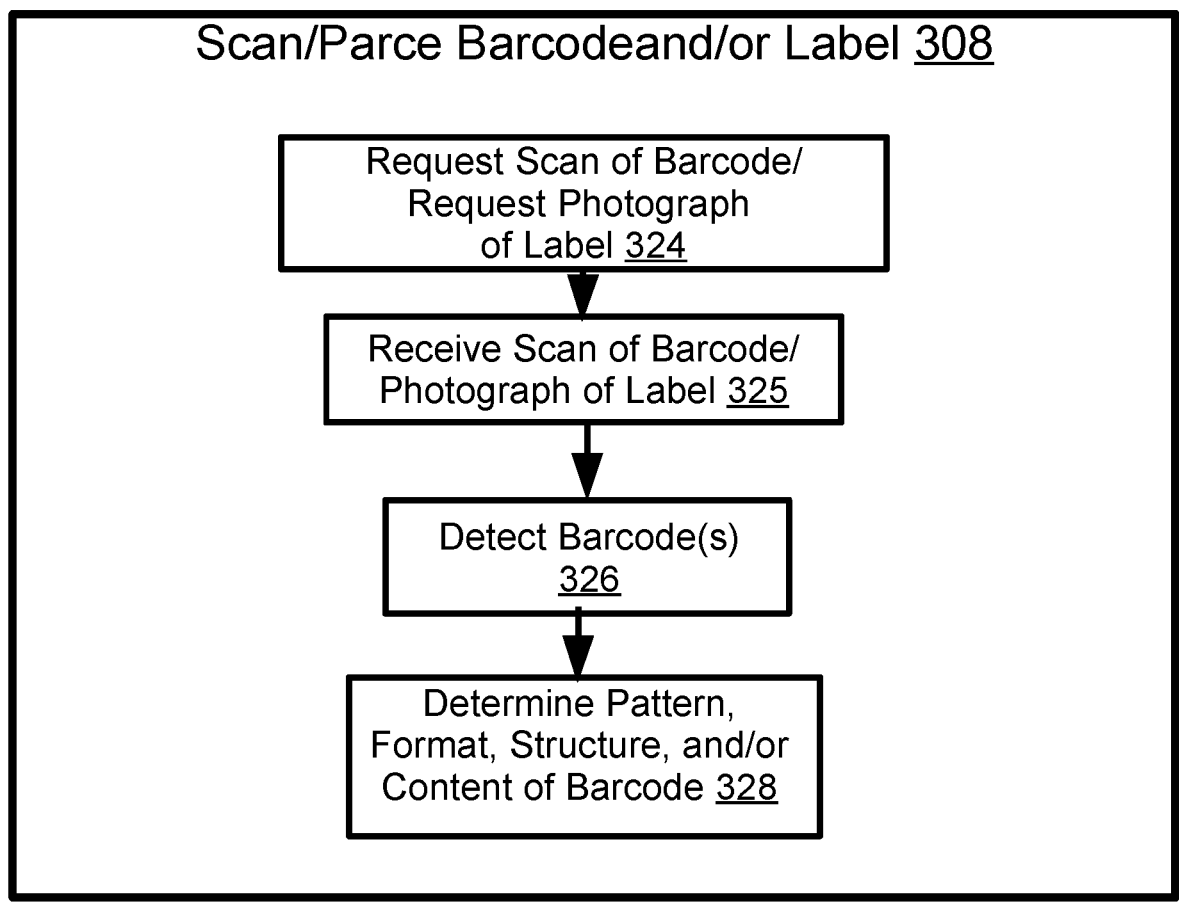
FIG. 3C shows a flowchart of an embodiment of at least one step of the method of FIGS. 3A and 3B.

In step 308 the barcode on the package is scanned and/or parsed. FIG. 3C gives a more detailed flowchart for embodiments of the process of scanning or parsing the barcode, which will be discussed below. However, in at least one embodiment, a request is sent to scan or parse the barcode or barcodes on the package. In at least one embodiment, optionally, the delivery person may be provided with instructions on how to scan or parse the barcode at the storage area (the locked area 102), via storage management system 106 or storage management system 230, or via processor system 218 or 240. In at least one embodiment, one more algorithms may be applied to convert the pattern of bars, boxes, and/or other shapes, into symbols. Optionally, in some cases, as a result of the symbology used by the delivery service not being a symbology used by any of the supported delivery services, system 100 may be incapable of converting the pattern of the barcode into symbols. For example, perhaps all of the supported delivery services use matrix barcodes, and the barcode on the package is not a matrix. In step 308, a laser scanner or other barcode scanner may scan the barcode. As part of step 308, a photograph of the barcode may be taken, and the image may be optically recognized. As part of step 308, optionally the image of the barcode may be recognized and determined by character recognition logic 202 to determine the characters that make up the barcode. Information about the delivery service and optionally about the sender, intended recipient, delivery person, and/or the type of package, for example, may be determined by barcode recognition logic 202 and/or by the delivery person entering the information storage management system 106.

In at least one embodiment, in step 309, the pattern of the characters of the barcode is analyzed to determine whether the barcode belongs to a supported delivery service.

Optionally, the symbology of the barcode may be analyzed to determine whether the symbology matches that of a supported delivery service (alternatively, the symbology may create a particular type of pattern of bars, boxes, and/or other shapes, which may be checked to determine if it matches that of a supported delivery service). For example, the relative spacing of the markings to one another, the thickness of the bars and the spaces between the bars, the shape of the bars, and the type of squares that may be on the package are analyzed by barcode format logic 204 to determine a format of the barcode (if a barcode is present). As part of step 308, the markings associated with the barcode on the package may be analyzed by barcode format logic 204 to determine what types of characters and/or what characters are on the label, whether there are lines, bars, squares, and/or other markings on the label that correspond to a barcode or to multiple barcodes.

As part of the step 309, the structure and/or format of the barcode may be determined by barcode format logic 204 and barcode data structure logic 206 (the format and/or structure of the barcode may be used to identify the delivery service associated with the barcode), by delivery service recognition logic 208. As part of step 309, the format of the barcode may be determined by barcode format logic 204, which may be input for delivery service recognition logic 208. In step 309, based in-part on delivery service recognition logic 208, the barcode information related to the delivery service is analyzed and extracted to identify whether the delivery service is a valid/supported delivery service or part of a list of delivery services from which packages are accepted, not on any list of delivery services, or on a list of delivery services from which packages are not accepted. The determination may be based on the format and/or structure of the barcode, such as the order that information appears in the barcode, the type of encoding of information used in the barcode, the spatial and visual characteristics of the barcode (e.g., how densely packed the bars in the barcode are, whether bars or squares are used, whether alphanumeric characters appear in the barcode) and/or on other characteristics of the barcode. For example, delivery service recognition logic 208 may search lists of delivery services in database 238.

In at least one embodiment, in step 309, if there is more than one barcode on the package, each of the barcodes may be analyzed to identify which, if any, barcode is a barcode of an accepted/supported delivery service. If two barcodes can be identified, an analysis may be made as to whether the pattern of symbols of at least one of the barcodes matches a supported delivery service, whether the information in both barcodes is consistent with one another, and whether it makes sense to have both barcodes on the same package. For example, does one or more barcodes indicate a change in delivery services during the course of delivery that would explain the presence of both barcodes on one package. A valid barcode may be identified by identifying the valid time for delivering the package (which may be determined based on the time sent which may be encoded in the barcode), whether the delivery service is a valid delivery service, and whether the package associated with the barcode has already been delivered, based on the format and/or data structure of the barcode. In step 309, a determination is made as to whether the barcode is valid and/or the delivery service is supported. The validity of the barcode may be determined by identifying whether the barcode or the converted barcode symbols are recognized—that they include known patterns of symbols that match a pattern for a delivery service that is supported, and/or include an address, a county, state, and/or city in a database in the system. Identifying whether the delivery service is supported can involve determining whether the sequence of symbols in the barcode (or the converted barcode) matches a pattern of symbols that is used by one or more supported delivery services (e.g., delivery services that are signed up for the storage room management system). In step 309, if it is determined, by delivery service recognition logic 208, that the barcode has a pattern (and/or format) that does not correspond to the pattern (and/or format) of any supported/acceptable delivery service, if the data structure does not correspond to the data structure of an accepted delivery service, if the time in the barcode for when the package was sent is outside of a time that is acceptable, or if the intended recipient does not correspond to anyone in the building to which the package is being delivered, the barcode may be determined to be an unacceptable barcode.

If the determination that the delivery service is supported and the determination that the barcode is valid is "yes," the process proceeds to step 310. If the determination is "no" the process stops, and a message is sent to the delivery person that the barcode is invalid and/or that the delivery service is not supported.

In step 310, if the pattern (and optionally the format) of the barcode corresponds to a supported delivery service, a message is sent to the delivery service providing the tracking number associated with the barcode at the storage area (the locked area 102), via storage management system 106 or storage management system 230, or via processor system 218 or 240. Which delivery service is contacted is determined by the pattern of the symbols in the tracking number. The supported service having a tracking number that fits the pattern of the tracking number on the package is contacted. If the tracking number fits the pattern of more than one supported service each supported delivery service is contacted. If multiple tracking numbers are on the package and more than one tracking number fits the pattern of the tracking number of one or more supported delivery services, each supported delivery service having tracking numbers that fit the patterns of the multiple tracking numbers that fit the pattern of tracking numbers of supported delivery services is contacted. If the tracking number belongs to an unsupported service, but the tracking number fits the pattern of the tracking numbers of a supported delivery service, although the supported delivery service is contacted, the supported delivery service will not recognize the package or else the delivery details of the package will not correspond to the package received.

In step 311, based on the tracking number, a message is received from the delivery service 116 with details about the delivery. The details may include the time of departure of the package and/or an expected delivery time, date of departure, and/or date of expected arrival. The delivery details may also include one or more of, but are not limited to, delivery address, name of intended recipient, telephone number of intended recipient, delivery address, name of intended sender, telephone number of sender, etc. The details provided to the system maybe the details that the delivery service 116 has that are associated with the tracking number extracted and/or derived from the barcode.

In step 313, information received from delivery service 116 is analyzed. The delivery service 116 provides the delivery details so that the system can validate the delivery details associated with the barcode and/or other information associated with the package and/or a label on the package. For example, based on delivery details (e.g., the departure time of the package and/or expected delivery time of the package) a window within which the package should have arrived may be computed. Additionally, or alternatively, system 100 may compare the information from the delivery service to the information the system has in its database about the package to determine if there is a discrepancy. Based on the comparison, a determination is made as to whether the delivery details from the delivery service match the delivery details associated with the barcode. If the delivery details do not match (e.g., the package was received outside of the computer window which the package should have arrived as a result of arriving too soon or too late), the process proceeds to step 314. If the information does match (e.g., the package arrived within the computed delivery time), the process proceeds to step 316. On rare occasions, a tracking number of an unsupported delivery service has a similar pattern as a supported delivery service, but the process weeds such a tracking number out when the supported delivery service is contacted, because the delivery details will not match and therefore step 313 will not validate the delivery details.

Optionally, in step 313, assuming that a valid barcode is found on the package, or that the package delivery is authenticated in some other manner, a location within the locked area is identified, by storage management system 230, to determine which locker and/or storage room should be unlocked (e.g., an area containing the locked area or locked areas 102 in FIG. 1). In an embodiment, if there is one storage room or if there are other storage areas in addition to a single storage room, the delivery person may be presented, via storage management system 106 or storage management system 230, with options for where to place the item, which may be dependent in-part on the size of the object. In an embodiment, validity of the barcode may be the sole criterion, used by security logic 212 (and storage management system 230), for determining whether to allow the user to enter. In an embodiment, the validity of the barcode is used by security logic 212 in combination with other credentials that were authenticated as the criteria for determining whether to allow the user to enter. In an embodiment, as a security feature, even if the package is properly addressed to a user of storage system 100, the delivery person may be denied access to the locked area 102 if the barcode (or other code or markings) on the package cannot be authenticated, does not have the characteristics of a barcode of an accepted delivery service, and/or cannot be matched with an accepted delivery service for other reasons.

In step 314, if the delivery details cannot be validated (e.g., the package arrived outside of the computed window for when the package should arrive) access is denied. In some embodiments, a message may be sent to the delivery person and/or delivery service that the delivery details did not match the details provided in association with the barcode. In some embodiments, the delivery person is apprised of the denial by a light (e.g., red), by an alarm, by a message on a GUI, by a message on a screen at the storage area, or by other means known to the skilled artisan. In some embodiments, the storage area does not unlock. In some embodiments, the fact that it did not unlock is the message that tells the delivery person that access was denied.

In step 316, the delivery person is allowed access. In some embodiments, allowing access means that the lock is triggered to open. In step 316, assuming that a valid barcode is found on the package, or that the package delivery is authenticated in some other manner, the lock is unlocked, by lock controller 214, of an area that includes a location where the package can be left. Optionally as part of step 312, a confirmation and/or instructions are presented by storage management system 106 or storage management system 230 to open the lock or storage area where the package is to be placed.

In step 318, the package is accepted into the storage area. In step 318, the item is placed and received in the storage room (unless there are other possible storage areas and another storage area was selected), and/or the apartment building door is opened. After the delivery person enters the locked area, the door relocks.

After step 318 (or after step 314), the process stops until a new barcode is parsed or scanned (see step 308).

In an embodiment, each of the steps of method 300*b* is a distinct step. In at least one embodiment, although depicted as distinct steps in FIG. 3B, steps 308-318 may not be distinct steps. In other embodiments, method 300*b* may not have all of the above steps and/or may have other steps in addition to or instead of those listed above. The steps of method 300*b* may be performed in another order. Subsets of the steps listed above as part of method 300*b* may be used to form their own method.

FIG. 3C

FIG. 3C shows a flowchart of an embodiment of a method for implementing the system of FIG. 1 from the point of view of the storage area manager providing an embodiment of scanning one or more barcode(s) (step 308 in FIG. 3B). Scanning or parsing of the one or more barcodes involves determining the format, structure and/or content of the barcode.

In step 324, a photograph of the label and/or a scan of the barcode is requested. In step 324, storage management system 106 or storage management system 230, via processor system 218 or 240, requests a photograph of the label on the package or of the package. The request may include instructions for photographing the package and/or for where to place the package for photographing. The request may be presented by output system 232 or sent by transmitter 244 to delivery service device 110 or user device 112. In some embodiments, the system provides information about whether the barcode(s)/label(s) is readable and/or whether the scan was successful.

In step 325, the scan or photograph is received. In step 325, the scan or photograph of the label or package is received from scanner 104*a*, camera 104*b*, camera driver 216, delivery service device 110, or user device 112, optionally via network 114, at input system 234 and/or receiver 242, at storage management system 106 or storage management system 230 of locker area 102 for analysis by processor system 218 or processor system 240. The photograph may include any one or all of the barcode on the package, the label on the package, the delivery person, and/or the item being delivered (the package). In an optional embodiment, the photograph is taken regardless of whether the sign-in is validated, via the search so as to track the delivery of the item. As mentioned in conjunction with FIG. 1, the photograph of the item may be sent to and/or stored in a location where the delivery service may view the photograph as part of a confirmation that the item was delivered.

In step 326, one or more barcodes is detected. In step 326, the photograph of the barcode or barcodes is analyzed to determine whether there is a barcode on the package and/or whether there are multiple barcodes on the package. In step 326, the spatial relations between the bars or squares of the barcode are determined in order to decode the barcode and determine the structure of the data within the barcode and the type of encoding used in the barcode.

In step 328, the format, structure and/or content of the barcode is determined. In step 328, the relative spacing of the markings to one another, the thickness of the bars and the spaces between the bars, the shape of the bars, the type of squares that may be on the package are analyzed by barcode format logic 204 to determine a format of the barcode (if a barcode is present). As part of step 328, the markings of the package are analyzed by barcode format logic 204 to determine what characters are on the label, whether there are lines, bars, squares, and/or other markings on the label that correspond to a barcode and/or to multiple barcodes. As part of step 328, the content of the barcode may be recognized and determined by character recognition logic 202 to determine what order distinct types of data appear in the barcode. Information about the delivery service and optionally about the sender, intended recipient, delivery person, and/or the type of package, for example, may be determined by barcode recognition logic 202 and/or by the delivery person entering the information storage management system 106. In an embodiment, different parts of the barcode provide different information about the delivery service, the address, the package, the sender, the time that the package was sent, and/or the valid time for delivery. As part of the step 328, the structure and/or format of the barcode may be determined by barcode format logic 204 and barcode data structure logic 206 (the format and/or structure of the barcode may be used to identify the delivery service associated with the barcode), by delivery service recognition logic 208. As part of step 328, the format of the barcode may be determined by barcode format logic 204, which may be input for delivery service recognition logic 208. As part of step 328, barcode reading logic 210 may parse the barcode to determine more information about the sender, intended recipient, and/or delivery service, which may also be used in a later step by delivery service recognition logic 208 to determine the delivery service (or determine whether a delivery service can be determined). In step 328, based in part on delivery service recognition logic 208, the barcode information related to the delivery service is analyzed and extracted to identify whether the delivery service is a valid delivery service or part of a list of delivery services from which packages are accepted, not on any list of delivery services, or on a list of delivery services from which packages are not accepted. The determination may be based on the format and/or structure of the barcode, such as order information, appears in the barcode, the type of encoding of information used in the barcode, the spatial and visual characteristics of the barcode (e.g., how densely packed the bars in the barcode are, whether bars or squares are used, whether alphanumeric characters appear in the barcode), and/or on other characteristics of the barcode. For example, delivery service recognition logic 208 may search lists of delivery services in database 238 to determine if the delivery service is a valid delivery service, for example, if the delivery service is on a list of delivery service from which packages are not accepted, is not on a list of accepted delivery services or is not found on any list.

In an embodiment, each of the steps of method 300*c* is a distinct step. In at least one embodiment, although depicted as distinct steps in FIG. 3C, steps 324-328 may not be distinct steps. In other embodiments, method 300*c* may not have all of the above steps and/or may have other steps in addition to or instead of those listed above. The steps of method 300*c* may be performed in another order. Subsets of the steps listed above as part of method 300*c* may be used to form their own method.

FIG. 3D

Figure 3D:
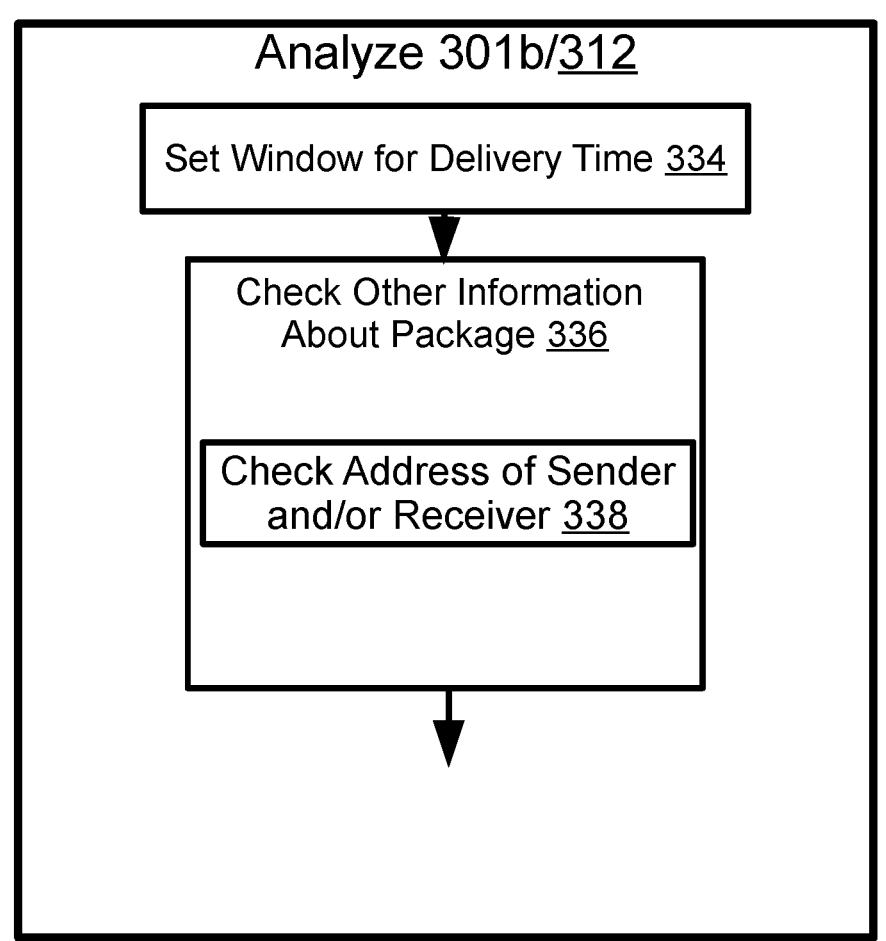
FIG. 3D shows a flowchart of an embodiment of at least one step of the method of FIGS. 3A and 3B.

FIG. 3D shows a flowchart of an embodiment of a method 300*d* for implementing the system of FIG. 1 from the point of view of the storage area manager providing an embodiment of analyzing information from the delivery service (see step 312 in FIG. 3B) and/or receiving a message from a delivery service (see step 301*b* in FIG. 3A).

In step 334, the system checks that the delivery is happening within a preset window of time and/or a window is set for delivery time for a specific package. The window may be based on the amount of time it takes to travel from the origin of the package to the storage area. The window may include a range that allows for estimated traffic (e.g., based on the time of day or known traffic route), delivery of other packages (to the same or other storage areas), and may include a buffer of time. In some embodiments, the delivery time is set by the delivery service, the delivery person, the package sender, and/or an algorithm provided by the system. If the package is not delivered within the delivery time, the package will not be accepted into the storage area.

In step 336 other information about the package is analyzed or checked. The other information is the information that the delivery service or delivery service has associated with the package or tracking number. The other information can be the address of the sender or receiver (see step 338). The other information may include, but is not limited to, the size of the package, the contents of the package, the time of delivery, the name of the deliverer or the sender, the storage area indicated, and a phone number or email associated with the delivery service or sender, the locker for delivery of the package.

In step 338, information about the address of the sender or receiver is checked. The address is the information that the delivery service has that is associated with the package or tracking number. Step 338 can occur in addition to or instead of step 336. In some embodiments, both addresses are checked. The address of the sender or receiver may be provided as part of the process of signing up for the delivery service using the storage room (by the sender, receiver, delivery person, delivery service, etc.), upon sign-in, within the barcode, via a photograph of the label, based on the tracking number, and/or by the delivery person (input upon arrival at the storage area). Notwithstanding the origin of the address information, the system may check to confirm that all of the sender addresses match and/or that all of the receiver addresses match.

In an embodiment, each of the steps of method 300d is a distinct step. In at least one embodiment, although depicted as distinct steps in FIG. 3D, steps 334-338 may not be distinct steps. In other embodiments, method 300d may not have all of the above steps and/or may have other steps in addition to or instead of those listed above. The steps of method 300d may be performed in another order. Subsets of the steps listed above as part of method 300d may be used to form their own method.

FIG. 4

Figure 4:
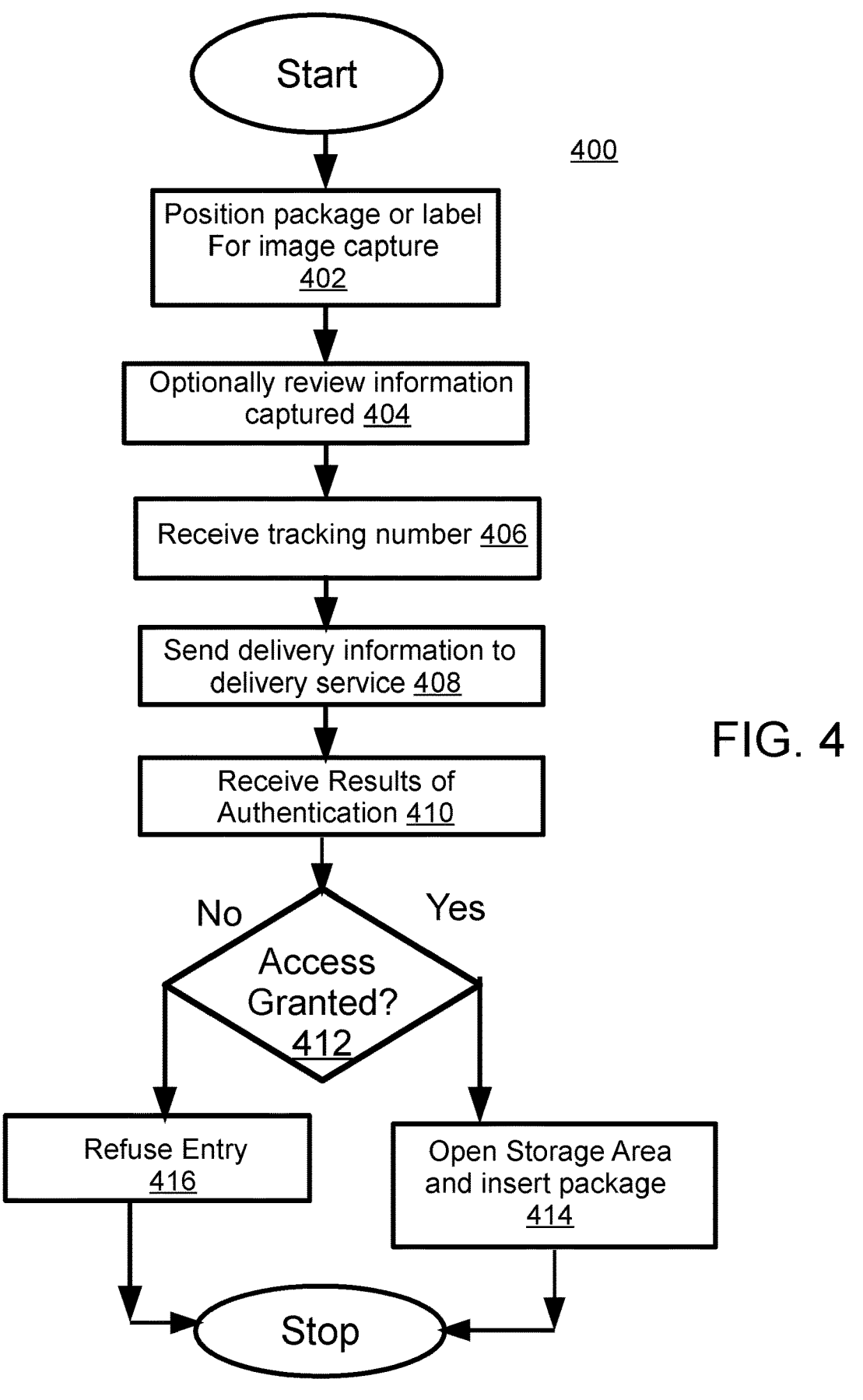
FIG. 4 shows a flowchart of an embodiment of a method of allowing entry into a delivery room or apartment building from the point of view of the delivery service person.

FIG. 4 shows a flowchart of an embodiment of method 400 implemented by the delivery service person of the device of the delivery service person, with the system 100 of FIGS. 1, 2A, and 2B.

Method 400 may be implemented by the delivery service person at a kiosk of storage management system 106 or by delivery service device 110 or user device 112 (which may have an application that performs method 400). The delivery person optionally provides sign-in information, via user device 112 or delivery service device 110, sign-in information is received and sent to storage management system 106, as a result of the delivery person signing into a computer associated with a locked area 110, a delivery service device 110, or into an application that runs on user device 112.

In step 402, a package is received in a location for image capture as a result of the delivery person positioning a package in a location associated with storage management system 106 or with respect to delivery service device 110 or user device 112, such that label and/or barcode(s) are positioned in front of a scanner 104a or camera 104b such that the scanner may scan or the camera can photograph one or all of the packages, label and/or barcode(s) and optionally the package itself and/or the delivery person. In at least one embodiment, the delivery person is provided with instructions and/or steps for best positioning the object, via a GUI, on a computer associated with the locked area 102, scanner 104a or camera 104b, and/or delivery service device 110. There may also be some other types of indicators for the correct positioning, including, but not limited to a beam of light, a sound, or a physical positioning via a box, outline, or template indicating where to place the package (and/or where the delivery person should stand with respect to the package if the camera is in delivery service device 110 or user device 112). Optionally, storage management system 106, delivery service device 110, and/or user device 112 may include a scanner and/or other device for capturing information from the package, which may be used as part of step 402.

In step 404, optionally, an image (and/or other information) is presented to the delivery person, allowing the delivery person to optionally review the photograph and/or returned information to make sure the relevant information is legible (or otherwise intelligible) in the photograph and/or correct (and/or includes all of the barcodes). In at least one embodiment, the package may have more than one barcode on the package, the system may provide information stating that one or more of the barcode(s) is not valid, and/or does not match with the delivery service information, does not match with the address on the label, that the time for delivery is not valid, or that the package associated with the barcode has already been delivered. If the delivery person does not approve of the information, the delivery person may start the process again, correct some of the information, and/or reenter some information. Optionally, the delivery person approves the information presented by the system 100 and causes the information to be submitted (e.g., sent from delivery service device 110 or user device 112) to the storage management system 106 for authentication.

In step 406, a tracking number is received by the delivery service, or the delivery person based on information the system has associated with a valid barcode on the package. In some embodiments, the tracking number is input into a carrier (or delivery service) database to pull up delivery information.

In step 408, delivery information is sent by the delivery service or delivery person to the system based on the tracking number providing information about delivery of the package. The delivery information sent by the delivery service is compared to the information the system has about the package based on the barcode and/or other information the system may have. The comparison is an authentication process to authenticate the delivery service and/or the barcode.

In step 410, results of the authentication process are presented to the delivery person. The delivery service device 110, user device 112, and/or the storage management system 106 may provide the information about authentication to the delivery person. The information may include why the authentication failed and/or how to proceed.

In step 412, a decision is made as to whether access is granted. If the decision is "no," the process proceeds to step 416. If the decision is "yes," the process proceeds to step 414.

In step 414, the storage area is opened, and the delivery person can insert the package. If the delivery service is authenticated, delivery service device 110, user device 112 and/or the storage management system 106 may produce a signal and as a result the delivery person is signaled that he/she may enter the locked area 102. The signal may include information, via information on a GUI associated with the scanner 104a or camera 104b, the storage management system 106 or the locked area 102, a sound, a light (e.g., a green light for entry, a red light for no entry), or any signal that clearly indicates that access is granted and/or the lock was unlocked.

In at least one embodiment, optionally after the delivery person is allowed entry, the locked area is automatically relocked. This may include a method for identifying when the door is opened or closed, a time provided that allows for a delivery person to enter in a reasonable amount of time, or the delivery person may indicate in some way that they have entered the locked area 102.

In step 416, the delivery person is refused entry. If the delivery service cannot be authenticated (or if other information is determined to be suspicious), the delivery person may be denied entry to the locked area.

In an embodiment, each of the steps of method 400 is a distinct step. In another embodiment, although depicted as distinct steps in FIG. 4, steps 402-416 may not be distinct steps. In other embodiments, method 400 may not have all of the above steps and/or may have other steps in addition to or instead of those listed above. The steps of method 400 may be performed in another order. Subsets of the steps listed above as part of method 400 may be used to form their own method.

EXAMPLE EMBODIMENTS

A method comprising:
receiving, at a storage system, captured information, the captured information being information captured from a received package, the captured information including at least information associated with a delivery service related to an article for an intended recipient, the information associated with the delivery service including a code, the storage system including at least
an information capture device that captures the captured information,
a processor system having at least one processor,
a memory system
storing one or more sets of characteristic features for identifying the particular delivery service that issued the the code (or a template), each set of characteristic features being characteristic features that are common to codes issued by a particular delivery service,
storing one or more machine instructions on one or more non-transitory computer readable media,
a controller for locking and unlocking a lock and a locked area having one or more locks;
comparing, by the storage system, the captured information to the one or more sets of characteristic features for identifying the particular delivery service;
and
unlocking the locked area, by the storage system, based at least on results of the comparing of the captured information to the one or more sets of characteristic features for identifying the particular delivery service.
The above method, wherein access is granted without determining the intended recipient based on the code.
A system that implements the above methods.

ALTERNATIVES AND EXTENSIONS

In alternative embodiments, any code may be used instead of a barcode. In alternative embodiments, any information or markings placed on a package by the delivery service or by a user or other entity as part of the makings used by a delivery service may be used instead of a barcode. The terms "information," "markings," "code," and "barcode" are used interchangeably, and each may be substituted one-for-another anywhere in the specification to get different embodiments. The word "information" is intended to be generic to "code," "barcode," "markings," and the word "code" is intended to be generic to the word "barcode." An example of codes that are not barcodes are any string of alphanumeric characters, which may be placed for the package by the delivery service, for example. Examples of markings include logos (e.g., of the delivery service), the coloring and designs on the special envelopes that users of the delivery service may use, such as the design or any part of the design of a priority mail envelope of the US Postal Service, and delivery envelope used by FedEx® (for example), and/or the stamp and/or postmark placed on an envelope that is being delivered by first class mail. In an alternative embodiment, if the delivery service cannot be identified or if there is no barcode (or other information or markings, depending on the embodiment) that can be identified with an acceptable or supported delivery service, although the locked area is not opened, another area (an "alternative area") may be provided for delivering the package. The area provided to a delivery service person that is associated with a delivery service that could not be identified or validated may have enhanced security to protect others from the delivery person, delivery service, and/or package being delivered. For example, the alternative area may be bomb-proof, in case the package is a bomb. The alternative area may have sensors for sensing poisonous chemicals, explosive chemicals, radioactive chemicals, biological chemicals and/or other dangerous chemicals. The alternative areas may include extra cameras so as to keep close surveillance on the delivery person. The locked area and the rest of the facility may be locked from and inaccessible, via the alternative area. Although the specification refers to barcodes, other types of markings and/or information may be placed on the package by the delivery service, and the system may check whether the characteristics of the markings have, and/or information has, the same characteristics as an accepted delivery service. In this specification, the terms acceptable delivery service, identifiable delivery service, and unsupported delivery service and any similar or synonymous terms are used interchangeably, and any such terms may be substituted one for another to obtain different embodiments.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:
1. A method comprising:
receiving, at a storage system, captured information, the captured information being information captured from a received package, the captured information including at least information associated with a delivery service related to an article for an intended recipient, the information associated with the delivery service including a code, the storage system including at least
an information capture device that captures the captured information, a processor system having at least one processor, a memory system storing one or more sets of characteristic features for identifying the particular delivery service that issued the code, each set of characteristic features being characteristic features that are common to codes issued by a particular delivery service, storing one or more machine instructions on one or more non-transitory computer readable media, a controller for locking and unlocking a lock and a locked area having one or more locks;

comparing, by the storage system, the captured information to the one or more sets of characteristic features; and unlocking the locked area, by the storage system, based at least on results of the comparing of the captured information to the one or more sets of characteristic features, wherein access is granted without determining the intended recipient based on the code.

2. The method of claim 1, receiving a message that indicates that the package was delivered at a particular time, and receiving the package after the particular time, the unlocking occurring as long as a time of arrival of the received package is within a predetermined window of time that is based on when the message indicates that the package was delivered and the window ending after the message indicates that the package was delivered.

3. A system comprising:

a storage system, including at least a processor system having at least one processor, at least an information capture device that captures information from incoming packages, a memory system storing one or more machine instructions on one or more non-transitory computer readable media, and a controller;

when the one or more machine instructions are implemented by the storage system, the system implementing a method comprising:

receiving, at the storage system, captured information, the captured information being information captured from a received package, the captured information including at least a plurality of codes associated with delivery service information, determining, by the storage system, based on the captured information, that the captured information includes the plurality of codes, determining whether at least one code of the plurality of codes is associated with an accepted delivery service, comparing, by the storage system, the captured information to one or more sets of characteristic features for identifying the particular delivery service that issued the code, each set of characteristic features being characteristic features that are common to codes issued by a particular delivery service, determining whether the captured information is associated with the accepted delivery service based on the comparing, and locking and unlocking, by the storage system, a locked area, the unlocking of the locked area being based on whether the captured information is associated with the accepted delivery service.

4. The system of claim 3, wherein the information capture device is a barcode reader.

5. The system of claim 3, wherein the information capture device is a camera, and the captured information is an image of at least part of the incoming package.

6. The system of claim 3, wherein the captured information includes graphical markings associated with the delivery service.

7. The system of claim 3, the plurality of codes including a sequence of symbols, the method further comprising determining whether the sequence of symbols has one of one or more predetermined patterns, a predetermined pattern being a pattern determined by a delivery service prior to placing the pattern on the received package.

8. The system of claim 7, the method further comprising if the sequence of symbols has one of the predetermined patterns, sending the at least one code to the accepted delivery service.

9. The system of claim 8, the method further comprising:

in response to sending the at least one code, receiving information about the received package from the accepted delivery service.

10. The system of claim 9, the method further comprising:

in response to receiving information about the received package from the accepted delivery service, determining a window for an acceptable delivery time, the window being an amount of time after the received package was sent that is based on how long it should have taken to deliver the received package; and validating the received package based at least on whether the received package arrived during the window for the acceptable delivery time.

11. The system of claim 3, the method further comprising:

determining a delivery window based at least on information received from a delivery service based on at least one code of the plurality of codes, the delivery window being an amount of time after the received package was sent that is based on how long it should have taken to deliver the received package, and access to a locked area is denied if the received package arrives outside of that delivery window.

12. The system of claim 7, the method further comprising:

if at least one code of the plurality of codes has a pattern that matches at least one pattern of the one or more predetermined patterns, sending the at least one code to a delivery service that uses the pattern that matches.

13. The system of claim 3, the method further comprising:

in response to receiving information associated with a received package associated with the at least one code of the plurality of codes, determining a window of time in which the received package should have arrived; and accepting the received package only if the received package arrived during the window of time determined.

14. The system of claim 3, the method further comprising:

determining a format of at least one of the plurality of codes, and determining whether the format matches a format for a code of a supported delivery service, and the unlocking of the locked area being based on whether the format matches.

15. The system of claim 10, wherein the at least one code is a barcode, and the barcode has a predetermined symbology, and the method further comprises determining whether the predetermined symbology is a symbology used by a supported delivery service, the predetermined symbology being determined prior to being placed on the received package.

16. The system of claim 15, the method further comprising:

determining one or more types of data in at least one code of the plurality of codes, and determining whether the one or more types of data match types of data of a code of an accepted delivery service, and the unlocking of the locked area being based on whether the match was found.

17. The system of claim 3, the method further comprising:

determining data fields within the at least one code of the plurality of codes and the determining of whether the captured information is associated with the accepted delivery service includes determining whether the accepted delivery service uses a code having the data fields within the at least one code, and the unlocking of the locked area being based on whether the accepted delivery service uses the code having the data fields.

18. The system of claim 17, the method further comprising:

determining whether the data fields within the at least one code are in a sequence of data fields found in the code used by the acceptable delivery service, and the unlocking of the locked area being based on whether the accepted delivery service uses the at least one code having the sequence of data fields of the at least one code on the received package.

19. The system of claim 3, the method further comprising:

determining whether information in at least one code of the plurality of codes is consistent with other information provided about the received package, and the unlocking being based on whether the information in the at least one code is consistent with the other information provided.

20. The system of claim 3, the method further comprising:

determining that the plurality of codes includes at least a first code of a first carrier and at least a second code of a second carrier, the first carrier being different than the second carrier; and determining whether a valid reason exists for the received package having the plurality of codes;

if the valid reason is found, unlocking the locked area; and if the valid reason is not found, keeping the locked area locked.

21. The system of claim 3, wherein a determination of whether the captured information is associated with the accepted delivery service is based at least on results of the comparing of the captured information to the one or more sets of characteristic features, and wherein access is granted without determining an intended recipient based on the code.

22. The system of claim 3, the one or more instructions, when implemented, causes the processor system to recognize data in information captured by the information capture device capturing the information from the packages of intended recipients;

the method further comprising:

locking and unlocking, by the storage system, a locked area, the unlocking of the locked area being based on whether the captured information is associated with the accepted delivery service;

wherein the intended recipients include registered and unregistered users; and wherein the system allows packages of unregistered users to be placed within one or more storage areas of the storage system.

23. A method comprising:

capturing, by an information capture device, information from packages of intended recipients;

recognizing, by a processor system, data in information captured by the information capture device capturing the information from the packages of the intended recipients, the processor system including one or more processors;

and securing, by a controller, a locked area of one or more storage areas, by locking and unlocking, by the controller, based at least on comparing characteristics of the information captured from the packages of the intended recipients to stored characteristics, the stored characteristics being characteristics features common to codes of an accepted delivery service that are stored for identifying delivery services;

wherein the intended recipients include registered and unregistered users; and wherein the system allows packages of unregistered users to be placed within the one or more storage areas.

* * * * *